(12) United States Patent
Winnett

(10) Patent No.: US 9,671,511 B2
(45) Date of Patent: Jun. 6, 2017

(54) HORIZONTAL STREAMER BROADBAND MARINE SEISMIC ACQUISITION CONFIGURATION AND PROCESSING

(71) Applicant: CGG SERVICES SA, Massy (FR)

(72) Inventor: Richard Winnett, Faversham (GB)

(73) Assignee: CGG SERVICES SAS, Massy (FR)

( * ) Notice: Subject to any disclaimer, the term of this patent is extended or adjusted under 35 U.S.C. 154(b) by 814 days.

(21) Appl. No.: 14/013,416

(22) Filed: Aug. 29, 2013

(65) Prior Publication Data

US 2014/0064027 A1 Mar. 6, 2014

Related U.S. Application Data

(60) Provisional application No. 61/722,204, filed on Nov. 4, 2012, provisional application No. 61/695,915, filed on Aug. 31, 2012.

(51) Int. Cl.
*G01V 1/38* (2006.01)
*G01V 1/28* (2006.01)
*G01V 1/36* (2006.01)

(52) U.S. Cl.
CPC .............. *G01V 1/28* (2013.01); *G01V 1/364* (2013.01); *G01V 1/3808* (2013.01); *G01V 1/38* (2013.01); *G01V 2210/123* (2013.01); *G01V 2210/56* (2013.01)

(58) Field of Classification Search
CPC ........ G01V 1/364; G01V 1/3808; G01V 1/28; G01V 1/38; G01V 2210/56; G01V 2210/123
See application file for complete search history.

(56) References Cited

U.S. PATENT DOCUMENTS

| | | | |
|---|---|---|---|
| 4,353,121 A | 10/1982 | Ray et al. |
| 5,148,406 A | 9/1992 | Brink et al. |
| 5,598,378 A | 1/1997 | Flentge |
| 5,617,372 A | 4/1997 | Gulunay et al. |
| 5,729,506 A | 3/1998 | Dragoset, Jr. et al. |
| 5,771,202 A | 6/1998 | Bale et al. |
| 6,028,817 A | 2/2000 | Ambs |
| 6,201,765 B1 | 3/2001 | Ireson |

(Continued)

OTHER PUBLICATIONS

B.J. Posthumus, "Deghosting Using a Twin Streamer Configuration", Geophysical Prospecting, Apr. 1993, pp. 267-286, vol. 31, No. 3 (Abstract only).

*Primary Examiner* — Krystine Breier
(74) *Attorney, Agent, or Firm* — Patent Portfolio Builders PLLC

(57) ABSTRACT

A method for de-ghosting marine seismic trace data is described. A reference seismic trace and a candidate seismic trace are selected from acquired seismic data. The acquired seismic data is gathered using a configuration wherein either a first streamer and a second streamer are disposed at different depths relative to one another and are laterally offset relative to one another, or using a configuration wherein a first source and a second source are disposed at different depths relative to one another and are laterally offset from one another. The reference seismic trace and the candidate seismic trace are processed, e.g., to perform normal moveout correction and/or vertical datum shifting, and the processed reference seismic trace is de-ghosted using the processed, candidate seismic trace.

15 Claims, 17 Drawing Sheets

(56) References Cited

U.S. PATENT DOCUMENTS

| | | |
|---|---|---|
| 6,493,636 B1 * | 12/2002 | DeKok .............. G01V 1/3861 367/20 |
| 7,372,769 B2 | 5/2008 | Grion |
| 7,386,397 B2 | 6/2008 | Amundsen et al. |
| 7,415,936 B2 | 8/2008 | Storteig et al. |
| 7,450,467 B2 | 11/2008 | Tveide et al. |
| 7,466,626 B2 | 12/2008 | Baaren |
| 7,489,590 B2 | 2/2009 | Grion |
| 7,499,373 B2 | 3/2009 | Toennessen |
| 7,505,360 B2 | 3/2009 | Bisley et al. |
| 7,518,951 B2 | 4/2009 | Solheim et al. |
| 7,551,515 B2 | 6/2009 | Christie et al. |
| 7,574,303 B2 | 8/2009 | Ferber |
| 7,584,057 B2 | 9/2009 | Ozbek et al. |
| 7,586,810 B2 | 9/2009 | Davies et al. |
| 7,599,798 B2 | 10/2009 | Beasley et al. |
| 7,626,887 B2 | 12/2009 | Aarre et al. |
| 7,659,724 B2 | 2/2010 | Alumbaugh et al. |
| 7,660,192 B2 | 2/2010 | Paulsen |
| 7,679,991 B2 | 3/2010 | Ferber |
| 7,715,988 B2 | 5/2010 | Robertsson et al. |
| 7,773,455 B2 | 8/2010 | Pickering et al. |
| 7,774,142 B2 | 8/2010 | Amundsen et al. |
| 7,782,708 B2 | 8/2010 | Christie et al. |
| 7,804,738 B2 | 9/2010 | Storteig et al. |
| 7,817,495 B2 | 10/2010 | Ozbek et al. |
| 7,835,224 B2 * | 11/2010 | Robertsson .............. B63B 21/56 367/20 |
| 7,840,204 B2 | 11/2010 | Bandaru |
| 7,881,152 B2 | 2/2011 | Storteig et al. |
| 7,894,298 B2 | 2/2011 | Manen et al. |
| 7,948,825 B2 | 5/2011 | Moldoveanu |
| 7,961,549 B2 | 6/2011 | Moldoveanu et al. |
| 7,961,551 B2 | 6/2011 | Robertsson et al. |
| 8,014,228 B2 | 9/2011 | Schreurs et al. |
| 8,050,139 B2 | 11/2011 | Berstad |
| 8,054,711 B2 | 11/2011 | Laake |
| 8,077,544 B2 | 12/2011 | Dragoset, Jr. |
| 8,116,166 B2 | 2/2012 | Robertsson et al. |
| 8,164,977 B2 | 4/2012 | Ferber |
| 8,174,927 B2 | 5/2012 | Hopperstad et al. |
| 8,218,393 B2 | 7/2012 | Beasley |
| 8,261,874 B2 | 9/2012 | Hopperstad et al. |
| 2010/0074049 A1 * | 3/2010 | Kragh .................. G01V 1/3808 367/16 |

* cited by examiner

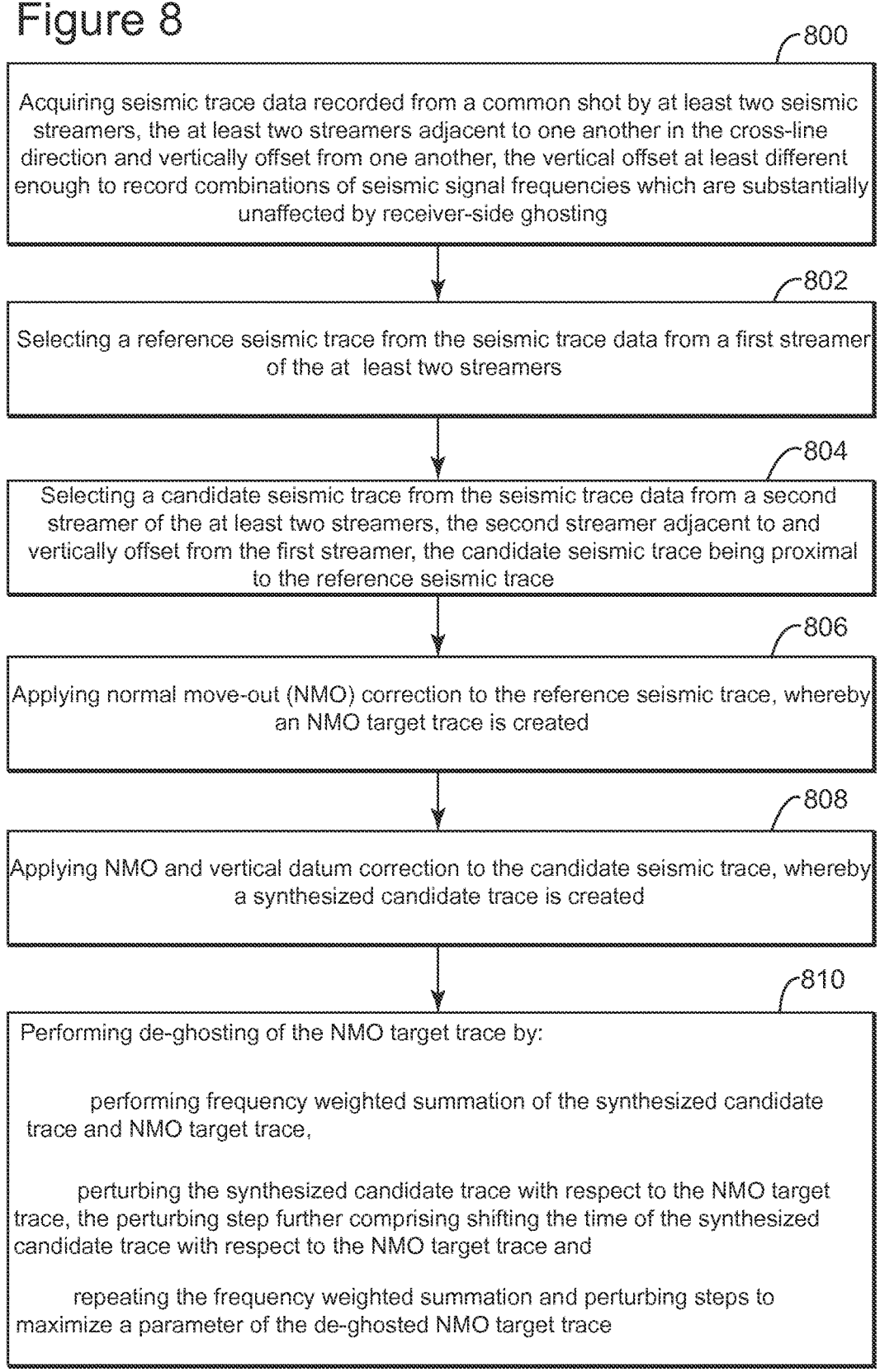

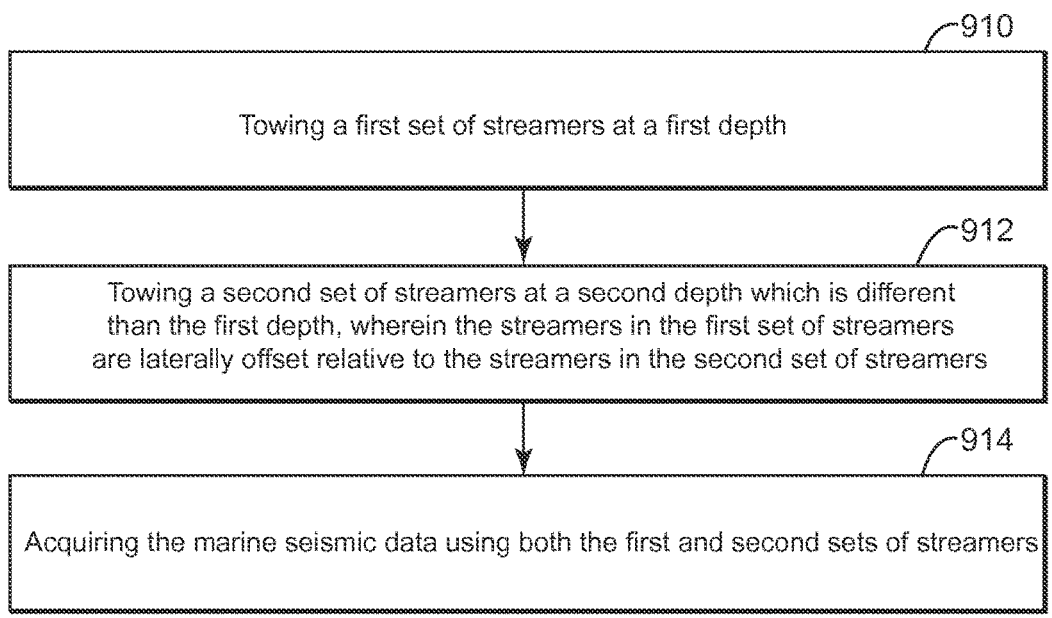

HORIZONTAL STREAMER BROADBAND MARINE SEISMIC ACQUISITION CONFIGURATION AND PROCESSING

PRIORITY INFORMATION

The present application is related to, and claims priority from, U.S. Provisional Patent Application No. 61/695,915, entitled "Horizontal Streamer Broadband Marine Seismic Acquisition Configuration and Processing", filed on Aug. 31, 2012, the disclosure of which is incorporated here by reference, as well as U.S. Provisional Patent Application No. 61/722,204, entitled "Seismic Target Illumination", filed on Nov. 4, 2012, the disclosure of which is incorporated here by reference.

BACKGROUND

1. Technical Field

Examples of the subject matter disclosed herein generally relate to methods and systems for seismic exploration and, in particular methods and systems for seismic data acquisition and seismic data processing directed to de-ghosting.

2. Description of the Background

To map subsurface geology during exploration for oil & gas or other minerals and fluids a form of remote sensing is employed to construct three dimensional images of the subsurface. The method relevant to this specification is known as seismic surveying where an energy source transmits pressure pulses into the earth which maybe reflected by geological interfaces in it and subsequently recorded at the surface by arrays of detectors. Such surveys are conducted on land using geophone detectors which vibrate and displace a magnet within a coil to induce an electric potential, or hydrophones in a marine environment which detect pressure changes due to the reflected wave-field and also induce an electric signal which may be recorded. In the marine environment the source's energy is transmitted and received from the subsurface via the water layer, the surface of which at the air-water interface, acts like a mirror by reflecting energy. As both the energy source and the hydrophone detectors lie within the water layer, to transmit and detect the emitted and reflected energy, reflections of the source and arrivals at the receiver are re-reflected from the water surface and contaminate the recorded wave-field.

Thus, there are two main contaminants which cause problems in processing and interpreting the sub-surface data. Complete reflections of the subsurface interfaces, caused by energy bouncing between the water bottom and air-water surface, which are known as multiples; and shorter period bounces known as ghosts. There are source-side ghosts caused by the source reflected back from the surface; and receiver-side ghosts incident at the detectors as down going surface reflections of the up-going energy from the sub-surface. Of the two contaminants, the latter is damaging to the reflection signal characteristics because the ghost periodicity is so close to the wavelengths of the reflections themselves.

These ghost reflections do more than complicate the subsurface image. The mirror effect which produces them changes the phase of the reflection by 180 degrees so that in some circumstances the energy constructively interferes with the desired signal to magnify it and sometimes it destructively interferes and nullifies the signal. Water surface reflections of very long wavelength, low frequency seismic waves, destructively interfere so there is always a null or notch at 0 Hz. The gradation from destructive to constructive interference manifests itself as if a sloped bandpass filter had been applied to the temporal frequency spectrum of the received traces. The width of this apparent bandpass filter is predictable. For example, in the case of the receiver-side ghost the second notch occurs when the seismic wavelength is equal to twice the receiver depth, as this is when the up-coming and down-going reflections are 180 degrees out of phase. The temporal frequency (F) at which this occurs may be determined if the velocity of propagation (V) of the wave in the fluid medium is known. Higher harmonics of this fundamental frequency naturally occur when multiples of their wavelengths are also equal to twice the receiver depth (Z), so all may be predicted by the relation:

$$F_n = Vn/(2Z), \text{ where } n=1,2,3 \ldots \text{etc.} \quad (1)$$

The change between the extremes of this constructive and destructive effect occurs smoothly, imparting a sine squared taper shaped filter to the amplitude of the recorded wave-field.

These notches and the associated filtering limit the extent to which subsurface reflections or events can be resolved. This damaging process results in blurred images at best, and at worst, fictitious reflections when the ghost energy lags significantly behind the primary reflection energy. This loss of resolution degrades the ability with which geophysicists, geologists and engineers can map the subsurface, possibly obscuring tell-tale details and characteristics which might be clues to the geological environment. To counter the effect of the notches themselves conventional seismic surveys are designed to use shallow source and receiver arrays to ensure that the second notch lies at high frequencies. However, the resultant sloped bandpass filter is a pervading problem as it causes seemingly irretrievable damage to low frequency information which is increasingly being sought in the industry to deliver extra value in the interpretation process.

To discern subsurface rock properties and prediction of content, seismic surveying systems routinely use arrays of detectors arranged at different offset distances away from the source so that a dynamic distortion effect known as move-out is observed and recorded. This distortion is routinely compensated during processing and simultaneously delivers information about the velocity of energy propagation through the subsurface. In a marine environment these arrays are towed in the water in a line behind a survey vessel which often, but not always, also tows a deployment of one or more seismic sources. To maximize the surface coverage for any one transit it is also normal to tow multiple arrays of detectors deployed parallel to each other perpendicular to the direction of the vessel's progression through the water. Each of the sources fires in turn to deliver energy into the water-column, thence transmitted and reflected back from the rock interfaces in the earth. The alternating sources illuminate distinct grids of mid-points instantaneously positioned notionally half way between each source and all detectors. The returning signal is recorded at a high fixed data rate for a time period like 10 seconds, arranged to be slightly less than the time it takes for the vessel to tow all the source and receiver arrays to the next source desired firing position. Each recorded trace, as it is called, notionally sounds the vertical position below the so called mid-point of its detector and source. In this manner, a huge quantity of data traces are recorded, all contaminated by ghost energy as described.

There are three data acquisition variations designed to tackle the ghost problem: slanted arrays of detectors; parallel arrays of detectors arranged vertically one above another at the same horizontal position, known as "over-under", and mixtures of different types of detectors at a coincident position, are representative. The former techniques exploit variations in the recorded ghost effect, which can be processed together to de-ghost the signals. The latter exploits the fact that up-going and down-going energy exhibit different polarity which one type of detector is able to observe, whereas the other type does not. This allows the ghost energy to be removed by careful summation of the two signals because the ghost is of opposite polarity in one of the recorded datasets. The slanted streamer array technique deploys (current) standard streamer equipment, whereas the other two data acquisition techniques use an increased number of streamers or sets of duplicate detectors, often called 'dual sensors'. These therefore increase, doubling at maximum, the amount of data traces recorded.

Once recorded, the data are routinely processed in a computer. The term de-ghosting is used to describe the computer based step to ameliorate or remove the ghost effect from the data. Fundamentally de-ghosting either involves some adaptive summation to extinguish the ghost by polarity difference, or adaptive summation of differently ghosted waveforms to recombine the primary signal present in both, in essence to infill the spectral notches.

Existing mechanisms to de-ghost seismic data all fundamentally rely on the recording of alternate views of the same data. Data are deliberately acquired with different ghost characteristics so that when combined there is improved signal spectrum coverage and the damaging notches are filled.

As ghosting occurs on both the source and receiver sides, a receiver side de-ghosting solution alone does not entirely compensate. Most of the existing techniques described below relate to receiver side de-ghosting. Source-side solutions tend to rely on re-designed source arrays to minimize their reflected ghost.

Ray et al. (U.S. Pat. No. 4,353,121 Oct. 5, 1982 Fairfield Industries, Inc. High resolution, marine seismic stratigraphic system) pioneered the use of streamers slanted from shallow to deep over the offset range to obtain a large variation in the ghost characteristics. After adjusting for the datum difference and application of NMO the variation or diversity of the ghost characteristics essentially fill spectral notches with primary energy once the data are stacked (summed). Additionally they showed that optimum alignment of the datum shifted ghost energy, after a suitable polarity change, could be used separately or in conjunction with the primary data to produce de-ghosted stack datasets.

Drawbacks of this approach include that the data prestack are at mixed datums, which can complicate the analysis of key properties like velocity, which is fundamental for processing.

R. Soubaras et al. extended this concept by deferring de-ghosting until the last step in data processing: migration, pre or post stack. They exploit the so called mirror-migration in a similar manner to Ray et al, aligning and imaging with polarity inverted ghost energy from virtual receivers at height Z above sea level instead of primaries at depth Z below sea level. In optimally focusing the ghost energy, this forms the down-going wave-field which is then used to de-convolve the upcoming wave-field, the product of a conventional migration process. Deferring the de-ghosting step until after migration has the apparent benefit of focusing both the primary and ghost energy to be more coincident in X, Y, Z, than recorded on common mid-point traces in the field.

The drawback to this approach is that the de-ghosting is deferred to this late stage of the processing and that the rest of the processing has been somewhat complicated by the data being acquired at a mixture of datums. Once again, the derivation of velocity field is complicated by this deferment, yet is crucial to the migration which precedes the de-ghosting.

Dual sensor, wave-field propagation separation, is a technique which exploits the polarity difference measured by two coincident but different types of sensor, one a hydrophone detecting pressure variations and the other a geophone sensing particle motion and therefore able to discriminate between up-going and down-going energy. After appropriate compensation for their different amplitude responses, the two signals are summed to remove the ghost from the pressure measurement because the down-going ghost has opposite polarity on the geophone trace. This is often referred to as the PZSUM technique and provides de-ghosting and de-multiple for towed streamer and ocean bottom acquisition systems.

Other methods require a minimum of two traces with different ghost characteristics, and seek to combine their energies to de-ghost the data or fill the notches. There are several techniques to effect this combination; predict the notch frequencies and design frequency mute transitions to merge energy from one trace to the next trace (U.S. Pat. No. 5,148,406 to Brink, et al.) such that the desired frequencies are spliced together; de-phase and sum, this designs an inverse operator based on the receiver depth and ghost reflectivity with that receiver's trace to undo the effect of its ghost, then sums together the results of this operation on the two traces to infill their respective notches; de-phase and frequency weighted summation method (B. J. Posthumus, Geophysical Prospecting 41, p 267-286, 1993; first presented at $52^{nd}$ EAGE meeting Copenhagen, May-June 1990) went further to compensate for the sum of the amplitudes of the de-phasing filters and to deliver de-ghosted data.

Obtaining the candidate trace pairs is done in a variety of ways. One way is over-under streamer acquisition, where coincident receiver traces sample the wave-field at two different depths and are combined to provide a de-ghosted wave-field. Although elegant, reliably and safely deploying such configurations is full of practical difficulties, e.g. ensuring that over-under streamers lie in the same vertical plane, and increased risk of tangling streamers.

Another way is called "sub-sampled over-under," where only sparse pairs of over-under streamers are towed to reduce equipment costs and minimize deployment difficulties. Missing data required for input to the frequency splicing method are reconstructed using interpolation (US Pat. App. Pub. 2010/0074049 A1 to Kragh, et al.). The cross-line separation of the deep streamers is much coarser than the shallow streamers such that interpolation of the sub-sampled deep data becomes band-limited to lower temporal and spatial frequencies. This is reasoned to be acceptable because the deeper data contains the desired low frequencies.

Another way is called "quasi over-under," where vertically staggered source and/or receiver arrays are deployed in a V or W pattern. DeKok, 2002 (U.S. Pat. No. 6,493,636 to DeKok) describes a method to reduce the ghost effect for quasi over-under data by subtracting cross-line spatially filtered estimates of the ghost periodicity from the recorded data. However, the method requires gathering a sufficient number of cross-line ordered traces to exhibit a repetitive pattern, sorting those gathers according to the data's crossline position, and then filtering using a filter for removing cross-line trace-to-trace variation.

Accordingly, it would be desirable to dispense with the requirements imposed by previous de-ghosting techniques and, instead, to perform de-ghosting in a different way, thereby avoiding the costs and pitfalls associated with these techniques.

SUMMARY

According to an embodiment, a method for acquiring and receiver de-ghosting marine seismic data includes acquiring seismic trace data recorded from a common shot by at least two seismic streamers, the at least two streamers adjacent to one another in the cross-line direction and vertically offset from one another, the vertical offset at least different enough to record combinations of seismic signal frequencies which are substantially unaffected by receiver-side ghosting, selecting a reference seismic trace from the seismic trace data from a first streamer of the at least two streamers, selecting a candidate seismic trace from the seismic trace data from a second streamer of the at least two streamers, the second streamer adjacent to and vertically offset from the first streamer, the candidate seismic trace being proximal to the reference seismic trace, applying normal move-out (NMO) correction to the reference seismic trace, whereby an NMO target trace is created, applying NMO and vertical datum correction to the candidate seismic trace, whereby a synthesized candidate trace is created; and performing de-ghosting of the NMO target trace by: performing frequency weighted summation of the synthesized candidate trace and NMO target trace, perturbing the synthesized candidate trace with respect to the NMO target trace, the perturbing step further comprising shifting the time of the synthesized candidate trace with respect to the NMO target trace and repeating the frequency weighted summation and perturbing steps to maximize a parameter of the de-ghosted NMO target trace.

According to another embodiment, a method for acquiring marine seismic data includes the steps of towing a first set of streamers at a first depth, towing a second set of streamers at a second depth which is different than the first depth, wherein the streamers in the first set of streamers are laterally offset relative to the streamers in the second set of streamers; and acquiring the marine seismic data using both the first and second sets of streamers.

According to another embodiment, a method for source de-ghosting of seismic trace data acquired by two shots each received by a streamer includes selecting a reference seismic trace associated with seismic trace data received by a streamer in connection with a first one of the two shots, selecting a candidate seismic trace associated with seismic trace data received by the same streamer in connection with a second one of the two shots, wherein the second shot of the at least two shots is fired adjacent to and vertically offset from the first shot, the vertical offset at least different enough to input combinations of seismic signal frequencies which are substantially unaffected by source-side ghosting, the candidate seismic trace being proximal to the reference seismic trace, applying normal move-out (NMO) correction to the reference seismic trace, whereby an NMO target trace is created, applying NMO and vertical datum correction to the candidate seismic trace, whereby a synthesized candidate trace is created; and performing de-ghosting of the NMO target trace by: performing frequency weighted summation of the synthesized candidate trace and NMO target trace, perturbing the synthesized candidate trace with respect to the NMO target trace, the perturbing step further comprising shifting the time of the synthesized candidate trace with respect to the NMO target trace and repeating the frequency weighted summation and perturbing steps to maximize a parameter of the de-ghosted NMO target trace.

According to another embodiment, a method for source de-ghosting marine seismic trace data includes selecting a reference seismic trace associated with seismic trace data received by a streamer in connection with a first one of the two shots, selecting a candidate seismic trace associated with seismic trace data received by the same streamer in connection with a second one of the two shots, wherein the second shot of the at least two shots is fired adjacent to and vertically offset from the first shot, the candidate seismic trace being proximal to the reference seismic trace; processing the reference seismic trace and the candidate seismic trace; and de-ghosting the processed, reference seismic trace using the processed, candidate seismic trace.

According to another embodiment, a method for receiver de-ghosting marine of seismic trace data acquired by a shot recorded at a plurality of marine seismic streamers, includes selecting a reference seismic trace associated with the seismic trace data from a first streamer of the plurality of streamers, selecting a candidate seismic trace associated with the seismic trace data from a second streamer of the at least two streamers, wherein the second streamer is adjacent to and vertically offset from the first streamer, the candidate seismic trace being proximal to the reference seismic trace, applying normal move-out (NMO) correction to the reference seismic trace, whereby an NMO target trace is created; applying NMO correction and vertical datum correction to the candidate trace, whereby a synthesized candidate trace is created, and performing a de-ghosting of the NMO target trace by: performing frequency weighted summation of the synthesized candidate trace and NMO target trace, perturbing the synthesized candidate trace with respect to the NMO target trace; and repeating the frequency summation and perturbing steps to generate a de-ghosted NMO target trace.

According to an embodiment, a method for source de-ghosting of seismic trace data acquired by two shots each received by a streamer includes selecting a reference seismic trace associated with seismic trace data received by a streamer in connection with a first one of the two shots, selecting a candidate seismic trace associated with seismic trace data received by the same streamer in connection with a second one of the two shots, wherein the second shot of the at least two shots is fired adjacent to and vertically offset from the first shot, the candidate seismic trace being proximal to the reference seismic trace, applying normal move-out (NMO) correction to the reference seismic trace, whereby an NMO target trace is created, applying NMO correction and vertical datum correction to the candidate trace, whereby a synthesized candidate trace is created, and performing a de-ghosting of the NMO target trace by: performing frequency weighted summation of the synthesized candidate trace and NMO target trace; perturbing the synthesized candidate trace with respect to the NMO target trace; and repeating the frequency summation and perturbing steps to generate a de-ghosted NMO target trace.

According to another embodiment, a method for acquiring marine seismic data includes the steps of towing a first set of streamers at a first depth, towing a second set of streamers at a second depth which is different than the first depth, wherein the streamers in the first set of streamers are laterally offset relative to the streamers in the second set of streamers; and acquiring the marine seismic data using both the first and second sets of streamers.

BRIEF DESCRIPTION OF THE DRAWINGS

The accompanying drawings illustrate embodiments, wherein:

FIGS. 7-11 are flowcharts illustrating de-ghosting methods according to embodiments.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure associated with de-ghosting seismic trace data acquired using various streamer and/or source configurations However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
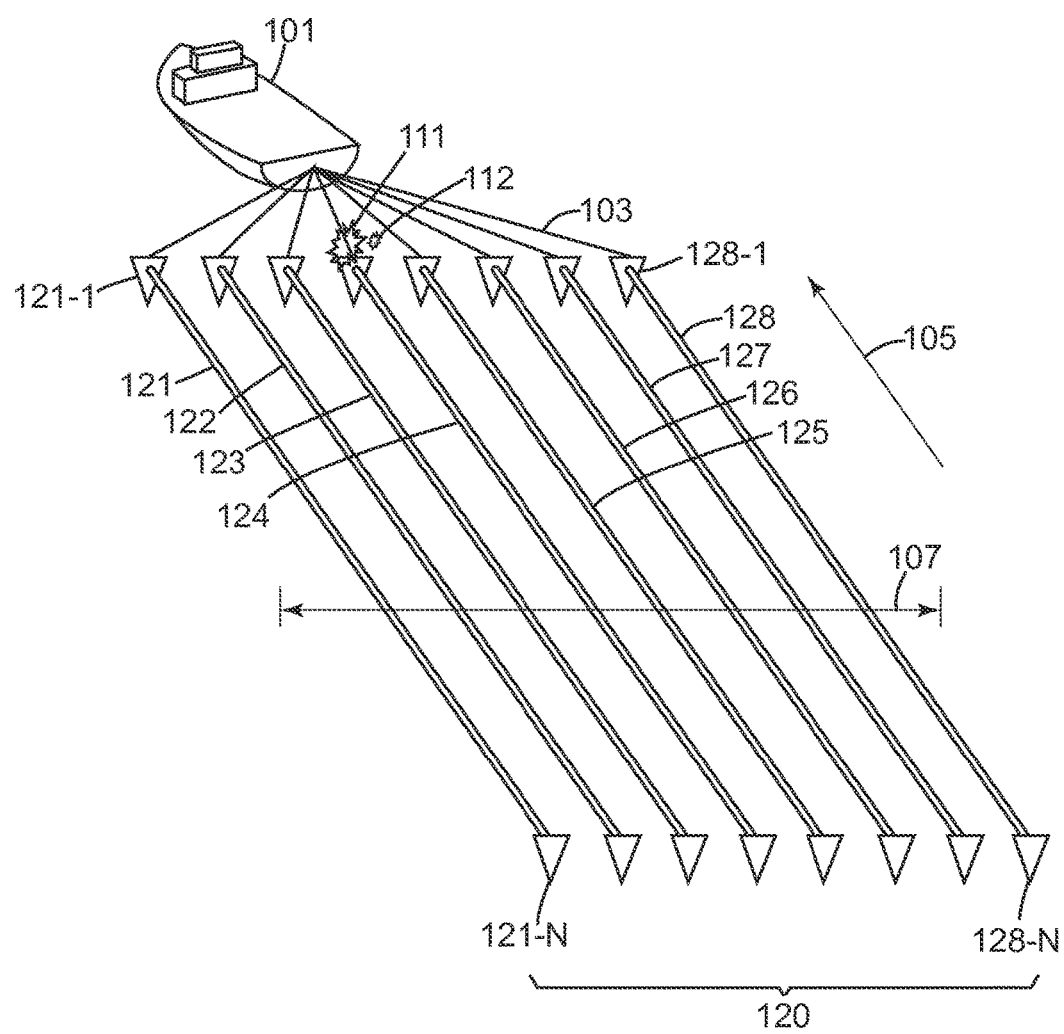
FIG. 1 illustrates a schematic representation of a 3-D perspective view of a seismic vessel towing an array of seismic streamer receiver cables and two seismic source arrays.

To provide some context for the subsequent discussion of embodiments for de-ghosting seismic data, consider first a number of different seismic data acquisition systems. For example, FIG. 1 illustrates a schematic representation of a 3-D perspective view of a seismic vessel towing an array of seismic streamer receiver cables and two seismic source arrays. Vessel 101 tows an array 120 of streamer cables 121 through 128 through a body of water. In this example, eight (8) streamer cables are illustrated for example only, a vessel may tow fewer or a greater number than eight. Tow lines 103 attach array 120 to vessel 101. Arrow 105 indicates the direction of translation of vessel 101 and corresponding array 120. Streamer cables 121 through 128 are generally parallel to each other, forming lines as they are towed behind vessel 101. The direction of translation, indicated by arrow 105, corresponds to the inline direction of streamer cables 121 through 128 of streamer array 120. Arrowhead line 107, conceptually perpendicular to the inline direction, indicates the cross line direction of streamer cables 121 through 128 of streamer array 120. In the cross line direction, indicated by arrowhead line 107, cable 122 is laterally adjacent and conceptually parallel to cable 121 on one side and cable 123 on the other side. The cables 121 through 128 are thus arranged as parallel rows in the inline direction offset from each other in order in the cross line direction, with cable 121 on one end and cable 128 on the other end across the cross line direction.

A first seismic source 111, which may be designated as S1, is also towed by vessel 101. Seismic source 111 is conceptually a single source and in typical examples is an array of individual sources whose firing times and/or relative spatial placement are coordinated to achieve a desired seismic propagation effect. A second seismic source 112, which may be designated as S2, is also towed by vessel 101. Seismic source 112 is conceptually a single source and in typical examples is an array of individual sources whose firing times and/or relative spatial placement are coordinated to achieve a desired seismic propagation effect.

Each seismic streamer cable 121 through 128 carries a plurality of seismic receivers. In example, seismic streamer receiver cable 121 carries N receivers 121-1, -2, . . . , to 121-N, with receiver 121-1 relatively close to vessel 101 and receiver 121-N relatively far from vessel 101. By like example, seismic streamer receiver cable 128 carries N receivers 128-1, -2, . . . , to 128-N, with receiver 128-1 relatively close to vessel 101 and receiver 128-N relatively far from vessel 101.

Figure 2:
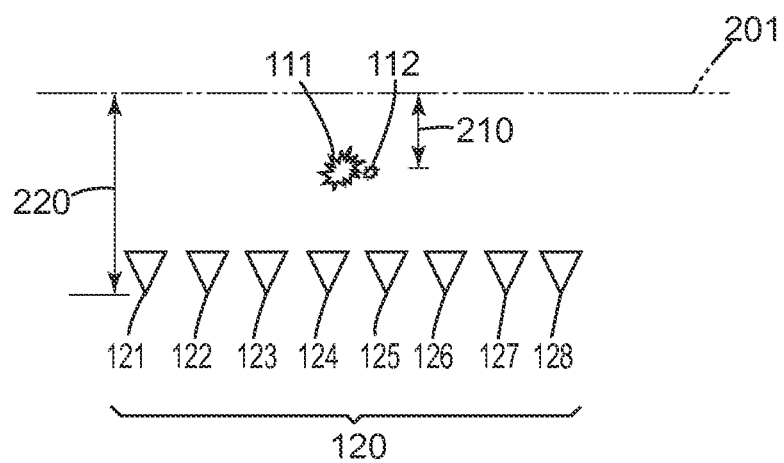
FIG. 2 illustrates a schematic representation of an end-on view of the towed array of seismic streamer receiver cables and two seismic source arrays of FIG. 1.

FIG. 2 illustrates a schematic representation of an end-on view of the towed array of seismic streamer receiver cables and two seismic source arrays. Water surface 201 is shown as a horizontal line of reference to indicate the relative positioning of the sources and receivers in this end-on view. First seismic source 111, or S1, is disposed at some depth below water surface 201. The source depth of seismic source 111 is indicated by source depth line 210. Second seismic source 112, or S2, is disposed at some depth below water surface 201. The source depth of seismic source 112 is indicated by source depth line 210.

Seismic streamer array 120 is indicated by an end view of seismic streamer receiver cables 121 through 128. Seismic streamer receiver cables 121 through 128 are disposed at some depth below water surface 201. The receiver depth of seismic streamer receiver cables 121 through 128 is indicated by streamer depth line 220.

Figure 3:
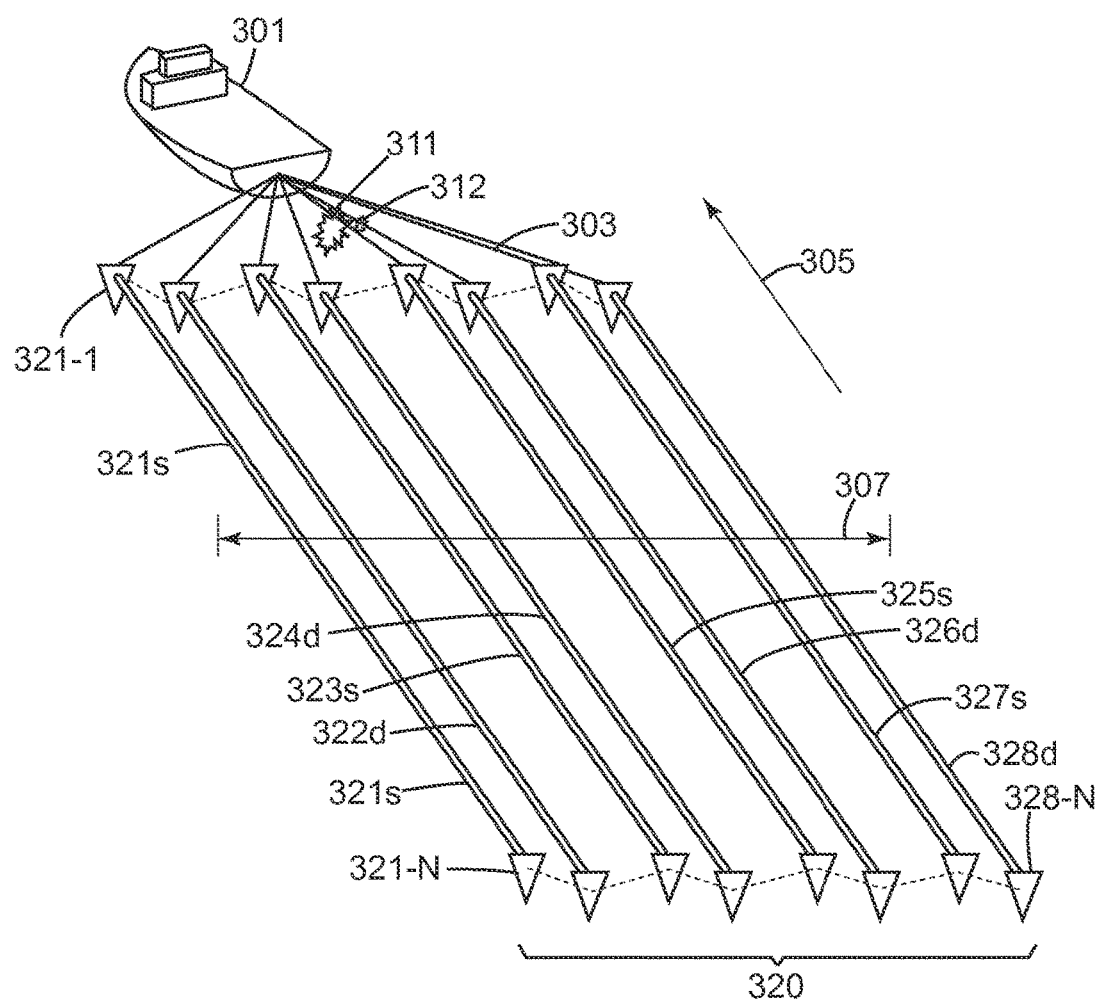
FIG. 3 illustrates a schematic representation of a 3-D perspective view of a seismic vessel towing an array of seismic streamer receiver cables in "W" configuration, with alternating cables having shallow and deep cable depths, and two seismic source arrays.

FIG. 3 illustrates a schematic representation of a 3-D perspective view of a seismic vessel towing an array of seismic streamer receiver cables in "W" configuration, with alternating cables having shallow and deep cable depths, and two seismic source arrays, which configuration can be used (as will be described below) to facilitate de-ghosting of the acquired seismic traces. Vessel 301 vessel tows an array 320 of streamer cables 321s through 328d through a body of water. Tow lines 303 attach array 320 to vessel 301. Arrow 305 indicates the direction of translation of vessel 301 and corresponding array 320. Streamer cables 321s through 328d are generally parallel to each other, forming lines as they are towed behind vessel 301. The direction of translation, indicated by arrow 305, corresponds to the inline direction of streamer cables 321s through 328d of streamer array 320. Arrowhead line 307, conceptually perpendicular to the inline direction, indicates the cross line direction of streamer cables 321s through 328d of streamer array 320. In the cross line direction, indicated by arrowhead line 307, cable 322d is laterally adjacent and conceptually parallel to cable 321s on one side and cable 323s on the other side. The cables 321s through 328d are thus arranged as substantially parallel rows in the inline direction offset from each other in order in the cross line direction, with cable 321s on one end and cable 328d on the other end across the cross line direction. Again, eight (8) streamer cables are shown by way of example, but there may be fewer or frequently more streamers towed in this configuration.

A first seismic source 311, which may be designated as S1, is also towed by vessel 301. Seismic source 311 is conceptually a single source and in typical examples is an array of individual sources whose firing times and/or relative spatial placement are coordinated to achieve a desired seismic propagation effect. A second seismic source 312, which may be designated as S2, is also towed by vessel 301. Seismic source 312 is conceptually a single source and in typical examples is an array of individual sources whose firing times and/or relative spatial placement are coordinated to achieve a desired seismic propagation effect.

Seismic streamer cables 321s, 323s, 325s, 327s are disposed at one depth below the water surface, relatively shallower from the other streamers in array 320. Seismic streamer cables 322d, 324d, 326d, 328d are disposed at another depth below the water surface, relatively deeper from the other streamers in array 320. The alternating pattern of streamer depths places array of seismic streamer receiver cables into a "W" configuration. In this example, cable 321s is disposed at shallower depth, the other cables alternating till cable 328d is disposed at deeper depth. In other examples, the depth of deployment of the streamer cables are swapped, for example cable 321s is deployed at deeper depth (renaming it as 321d, for example), the other cables alternating till cable 328d is deployed at shallower depth (renaming it as 328s, for example). In one example, the method requires a staggered depth of deployment between adjacent streamers. In one example, the method requires a staggered depth of deployment of all adjacent streamers. Examples of relative depth ratios for the deep to shallow streamers are provided below.

Each seismic streamer cable 321s through 328d carries a plurality of seismic receivers. In one example, seismic streamer receiver cable 321s carries N receivers 321-1, -2, . . . , to 321-N, with receiver 321-1 relatively close to vessel 301 and receiver 321-N relatively far from vessel 301. By like example, seismic streamer receiver cable 328d carries N receivers 328-1, -2, . . . , to 328-N, with receiver 328-1 relatively close to vessel 301 and receiver 328-N relatively far from vessel 301.

Figure 4:
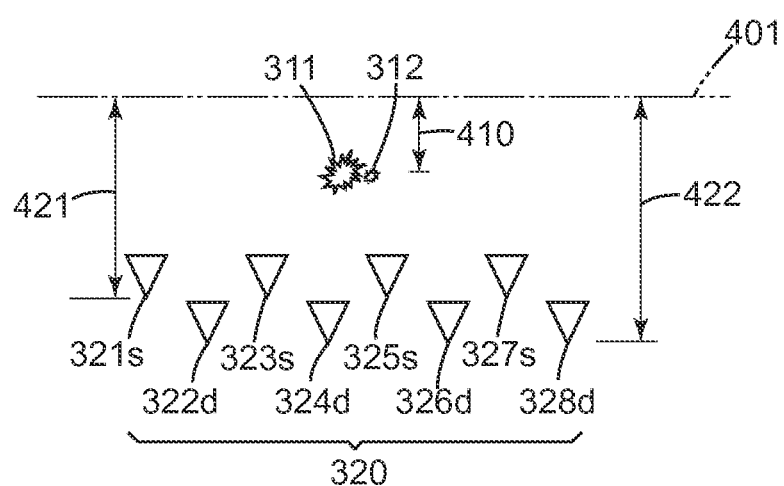
FIG. 4 illustrates a schematic representation of an end-on view of the towed "W" configuration array of seismic streamer receiver cables and two seismic source arrays of FIG. 3.

FIG. 4 illustrates a schematic representation of an end-on view of the towed "W" configuration array of seismic streamer receiver cables and two seismic source arrays of FIG. 3. Water surface 401 is shown as a horizontal line of reference to indicate the relative positioning of the sources and receivers in this end-on view. First seismic source 311, or S1, is disposed at some depth below water surface 401.

The source depth of seismic source 311 is indicated by source depth line 410. Second seismic source 312, or S2, is disposed at some depth below water surface 401. The source depth of seismic source 312 is indicated by source depth line 410. Alternatively, sources 311 and 312 could be disposed at different depths relative to one another as will be discussed below with respect to FIG. 6.

Seismic streamer array 320 is indicated by an end view of seismic streamer receiver cables 321s through 328d. Seismic streamer receiver cables 321s, 323s, 325s, 327s are disposed at one depth below water surface 401. The receiver depth of seismic streamer receiver cables 321s, 323s, 325s, 327s is indicated by streamer depth line 421, indicating the shallower streamer array depth of the shallower receiver cables. Seismic streamer receiver cables 322d, 324d, 326d, 328d are disposed at another depth below water surface 401. The receiver depth of seismic streamer receiver cables 322d, 324d, 326d, 328d is indicated by streamer depth line 422, indicating the deeper streamer array depth of the deeper receiver cables. In other examples, the depth of deployment of the streamer cables are swapped, for example, alternating deeper and shallower instead of shallower and deeper.

Figure 5:
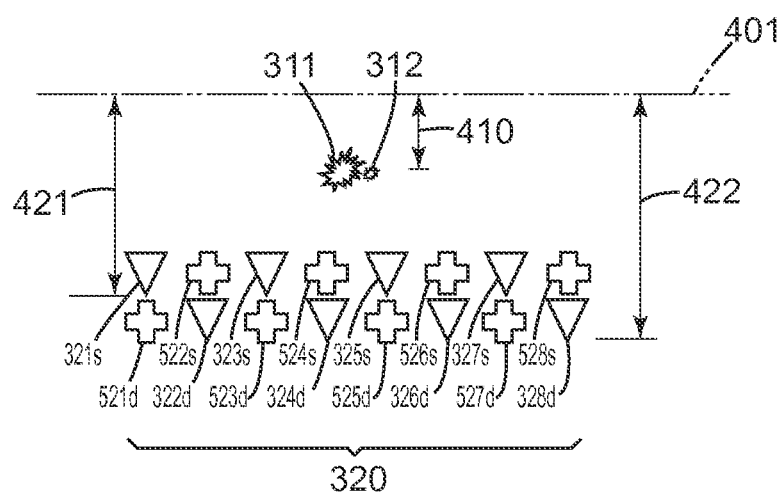
FIG. 5 illustrates a schematic representation of an end-on view of the towed "W" configuration array of seismic streamer receiver cables and two seismic source arrays, with conceptual placement of additional cables at interspersed locations.

FIG. 5 illustrates a schematic representation of an end-on view of the towed "W" configuration array of seismic streamer receiver cables and two seismic source arrays, with synthesized receiver traces. Water surface 401 is shown as a horizontal line of reference to indicate the relative positioning of the sources and receivers in this end-on view. First seismic source 311, or S1, is disposed at some depth below water surface 401. The source depth of seismic source 311 is indicated by source depth line 410. Second seismic source 312, or S2, is disposed at some depth below water surface 401. The source depth of seismic source 312 is indicated by source depth line 410.

Seismic streamer array 320 is indicated by an end view of seismic streamer receiver cables 321s through 328d. Seismic streamer receiver cables 321s, 323s, 325s, 327s are disposed at one depth below water surface 401. The receiver depth of seismic streamer receiver cables 321s, 323s, 325s, 327s is indicated by streamer depth line 421, indicating the shallower streamer array depth of the shallower receiver cables. Seismic streamer receiver cables 322d, 324d, 326d, 328d are disposed at one depth below water surface 401. The receiver depth of seismic streamer receiver cables 322d, 324d, 326d, 328d is indicated by streamer depth line 422, indicating the deeper streamer array depth of the deeper receiver cables.

The "W" configuration array of seismic streamer array 320, having only one streamer in each cross line lateral position, leaves locations where no streamer cable exists. For example, locations 521d, 523d, 525d, 527d have no streamer and are disposed at one depth below water surface 401, corresponding to the depth of actual receivers 322d, 324d, 326d, 328d, as indicated by streamer depth line 422, indicating the deeper streamer array depth of the deeper receiver cables. Locations 522s, 524s, 526s, 528s are conceptually disposed at another depth below water surface 401, corresponding to the depth of actual receivers 321s, 323s, 325s, 327s, as indicated by streamer depth line 421, indicating the shallower streamer array depth of the shallower receiver cables. Thus, in one example, each cross line lateral position has an actual receiver cable at one depth and a location for a receiver cable at another depth. For example, at one cross line lateral position there is placed receiver cable 321s at shallower depth, indicated by depth line 421, and a location 521d at the deeper depth, indicated by depth line 422. Both are located at the same cross line lateral position. Thus, as will be described below, synthesized traces can be generated to reflect an estimation of traces that would have been acquired if streamers with receivers had actually been provided at the locations 521*d*-527*d* and/or 522*s*-528*s*.

Figure 6A:
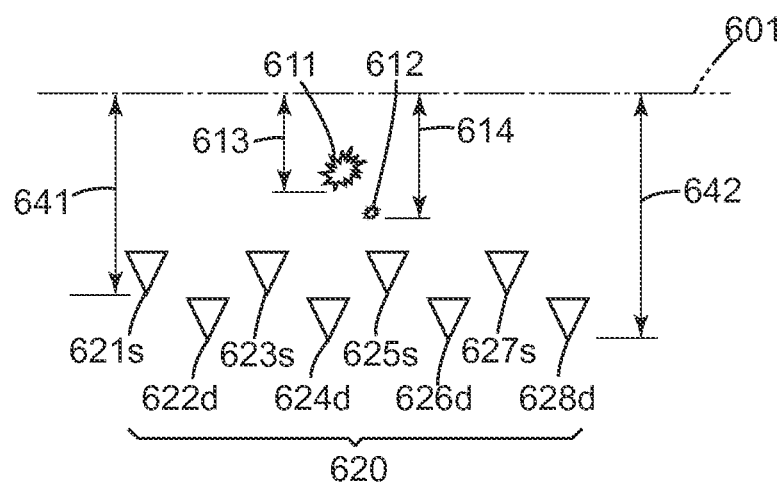
FIG. 6(a) illustrates a schematic representation of an end-on view of the towed "W" configuration array of seismic streamer receiver cables and two seismic source arrays, the two seismic source arrays each at different depth.
Figure 6B:
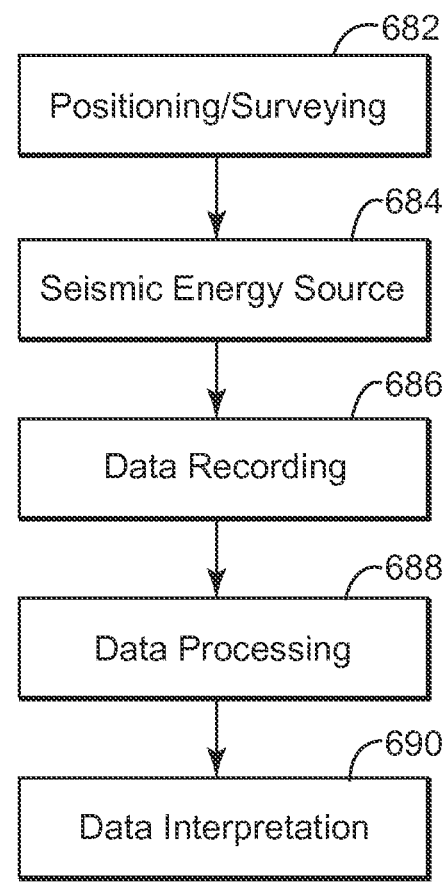
FIG. 6(b) is a flow chart illustrating a general method of seismic exploration.

FIG. 6(*a*) illustrates a schematic representation of an end-on view of the towed "W" configuration array of seismic streamer receiver cables and two seismic source arrays, the two seismic source arrays each at a different depth. Water surface 601 is shown as a horizontal line of reference to indicate the relative positioning of the sources and receivers in this end-on view. First seismic source 611, or S1, is disposed at some depth below water surface 601. The source depth of seismic source 611 is indicated by source depth line 613. Second seismic source 612, or S2, is disposed at another depth below water surface 401, relatively deeper than the source depth of seismic source 611. The source depth of seismic source 612 is indicated by source depth line 614.

Seismic streamer array 620 is indicated by an end view of seismic streamer receiver cables 621*s* through 628*d*. Seismic streamer receiver cables 621*s*, 623*s*, 625*s*, 627*s* are disposed at one depth below water surface 601. The receiver depth of seismic streamer receiver cables 621*s*, 623*s*, 625*s*, 627*s* is indicated by streamer depth line 641, indicating the shallower streamer array depth of the shallower receiver cables. Seismic streamer receiver cables 622*d*, 624*d*, 626*d*, 628*d* are disposed at another depth below water surface 601. The receiver depth of seismic streamer receiver cables 622*d*, 624*d*, 626*d*, 628*d* is indicated by streamer depth line 642, indicating the deeper streamer array depth of the deeper receiver cables. The depth of deployment of streamer cable 621 through 628 may be swopped across the array 620 so that 628 is deployed at a shallow depth and 621 at a deep depth etc. The method just requires a staggered depth deployment of all adjacent streamers. Similarly the depth of deployment of source 611 and source 612 may be swapped from shallow/deep to deep/shallow, the method just requires sources 611 and 612 to be at different depths.

As generally discussed above, one purpose of seismic exploration using the afore-described (and other) acquisition configurations is to render the most accurate possible graphic representation of specific portions of the Earth's subsurface geologic structure. The images produced allow exploration companies to accurately and cost-effectively evaluate a promising target (prospect) for its oil and gas yielding potential (i.e., hydrocarbon deposits). FIG. 6(*b*) illustrates one generalized method for performing seismic exploration (method 680). Therein, there are five main steps: a detailed discussion of any one of the process steps would far exceed the scope of this document, but a general overview of the process should aid in understanding where the different aspects of the following embodiments can be used.

Step 682 generally refers to aspects of positioning and surveying of the potential site where the seismic exploration is to be performed. Step 684 generally refers to the illumination or shooting of a geographic area using one or more seismic sources, e.g., using acoustic waves. While method 680 generally applies to both marine and land seismic exploration systems, each may use different types of equipment, e.g., different types of receivers (such as hydrophones or geophones) and/or different types of sources. In step 686, data recording occurs. In a first part of this step, the seismic receivers receive reflected energy associated with the source transmissions and, most often, digitize the data associated therewith. In a second part of the step 686, the data is transferred to a recording station. In step 688, data processing occurs. Data processing generally involves enormous amounts of computer processing resources, including the storage of vast amounts of data, multiple processors or computers running in parallel to perform a number of different techniques on the raw data to make it more useful in generating outputs which can be used by those skilled in the art to assess the subsurface geologic structure of the area which was shot. One of those techniques is de-ghosting, embodiments of which are described below. Finally, in step 690, data interpretation occurs and results can be displayed, sometimes in two-dimensional form, more often now in three dimensional form. Four dimensional data presentations (a 3D plot or graph, over time (the fourth dimension) are also possible, when needed to track the effects of other processes, for example, e.g., by comparing two or more 3D data sets acquired at separate times to track time variant changes associated with, for example, the extraction of hydrocarbons.

Having described various seismic acquisition systems and techniques in which the following de-ghosting embodiments can be used, a discussion of such de-ghosting embodiments will now be provided. In an embodiment, a de-ghosting method is disclosed for data acquired using a V or W streamer configuration to provide a diversity of ghost-characterized data sufficient for de-ghosting. A de-ghosting procedure is applied to the acquired data to perform the implicitly required interpolation within an optimized frequency weighted summation technique, as for example characterized by Posthumus (1993).

In one example, a method is described where the amount of data recorded and the equipment required may not differ from the conventional marine data acquisition technique. The manner of the deployment of the detector arrays, often called streamers or cables, varies. Streamers are deployed in a conventional horizontal plane with alternate neighboring streamers towed at different depths to experience different ghost filtering effects. Choice of depth combinations is discussed herein and a data processing step is described to enable different mid-point traces to be combined for their mutual de-ghosting. In one example, a method and system is provided for both receiver and source side de-ghosting.

Figure 7:
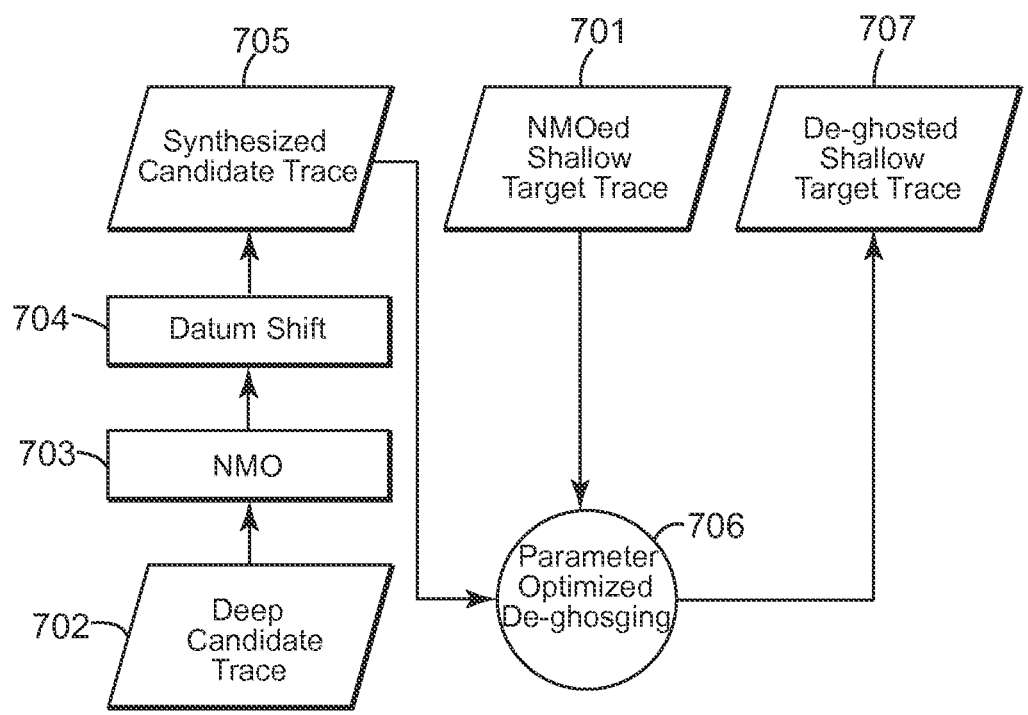

FIG. 7 illustrates a schematic flowchart of de-ghosting processing methods of seismic data according to embodiments. A seismic trace from one of the shallow streamers is selected as the shallow target trace and normal moveout (NMO) correction is applied to the trace, resulting in a normal-moved-out shallow target trace, shown as trace 701. As is well known in the art, normal moveout refers to the effect that the offset distance between a seismic source and a receiver has on the arrival time of a reflection, and can be used to distinguish between reflections and other events such as refractions, diffractions and multiples. For example, according to the embodiment of FIG. 7, the shallow target trace can be selected from data received by a receiver on streamer 323*s* of FIG. 5. A seismic trace 702 from one of the deep streamers is selected as the deep candidate trace, trace 702. In one example, deep candidate trace 702 is laterally adjacent to the selected shallow target trace used to make trace 701. For example, the deep candidate trace can be selected from data received by a receiver on streamer 322*d* of FIG. 5. In an alternate example, the deep candidate trace is selected from streamer 324*d* of FIG. 5, being that it is also an adjacent trace disposed laterally on the other side of streamer 323*s*. Normal moveout is applied to deep candidate trace 702, as shown by step 703. A datum shift is applied to the normal-moved-out deep candidate trace from step 703, as shown by step 704, resulting in a synthesized candidate trace, trace 705 at the datum of the moved out target trace 701.

Normal move-out shallow target trace 701 and synthesized candidate trace 705 are used to perform a parameter-optimized de-ghosting, step 706, resulting in an output of a de-ghosted shallow target trace, 707. For example, de-ghosted shallow target trace 707 is now the de-ghosted trace at streamer location 323s of FIG. 5.

Numerous variations are contemplated with respect to the embodiment of FIG. 7, several of which will now be discussed for purposes of illustration rather than limitation. For example, FIG. 7 uses an adjacent deep candidate trace to de-ghost a shallow target trace. By another example, using the same methodology illustrated in FIG. 7, an adjacent shallow candidate trace is used to de-ghost a deep target trace. Moreover, in the example of FIG. 7, only the candidate trace is datum shifted such that the synthesized candidate trace and the moved out target trace are at the same datum. However, in another example, both the normal-moved-out candidate trace and the normal-moved-out target trace have different datum shifts applied to place them at a common datum, prior to their use to de-ghost the re-datumed target trace.

In one example, de-ghosting step 706 comprises frequency weighted summation using the method of Posthumus (described in "Deghosting using a twin streamer configuration", Geophysical Prospecting 41, 267-287, 1993, the disclosure of which is incorporated herein by reference).

In one example, parameter-optimized de-ghosting, step 706, refers to perturbing two receiver traces (for example, trace 701 and trace 705) so that their frequency weighted sum maximizes the Wiener entropy or spectral flatness over a prescribed range of frequencies consistent with the likely receiver or source ghost notch frequencies of the said two receiver traces. In one example, "perturb" refers to causing the relative vertical alignment of two receiver traces to be varied. Such perturbation is made so as to more optimally align the two signals to compensate for small errors in their move-out, local differences in geological structure and differences in the depth of the receiver or source arising from poor systematic translation control and/or irregular water surface caused by marine vessel, wind, tide or atmospheric pressure induced waves.

In one example, de-ghosting, step 706 utilizes a ghost characterization derived from a measured depth of translated receivers and theoretical water surface reflection coefficient of approximately −1.0. In one example, de-ghosting, step 706 utilizes a ghost characterization determined from the autocorrelation of the respective receiver traces which are constrained by the characterization derived from measured depth of translated receivers and theoretical water surface reflection coefficient of approximately −1.0. In another example, de-ghosting, step 706 includes an optimization which is facilitated by picking the peak time delay of a temporal cross correlation of any neighbouring candidate receiver trace for de-ghosting interpolation with the reference receiver trace to constrain their alignment.

In one example, de-ghosting, step 706 includes time variant optimized de-ghosting wherein each optimized de-ghosting step as described, occurs separately in short abutting or overlapping time windows. Such a time variant approach accommodates expected variations in both the ghost characteristics and in the expected structural, move-out etc variations relevant to the implicit interpolation/extrapolation within the optimized de-ghosting. In another example, de-ghosting step 706 includes depth optimized de-ghosting. In one example, the measured depth of target trace 701 and datum shifted synthesized candidate trace 705 are perturbed to optimize the Wiener entropy. In another example, de-ghosting step 706 includes utilizing reflectivity optimized de-ghosting. In one example, parameter-optimized de-ghosting step 706 includes a combination of depth optimized de-ghosting and reflectivity optimized de-ghosting, both depth and reflectivity used to simultaneously optimize the Wiener entropy. In one example, the combination of depth optimized de-ghosting and reflectivity optimized de-ghosting is performed after perturbing the two receiver traces (for example, trace 701 and trace 705) so that their frequency weighted sum maximizes the Wiener entropy or spectral flatness over a prescribed range of frequencies consistent with the likely receiver or source ghost notch frequencies of the two receiver traces.

Having described various aspects of de-ghosting techniques according to embodiments, some methods for performing de-ghosting of seismic data will now be described with respect to the flowcharts of FIGS. 8-11. According to one embodiment, illustrated in the flowchart of FIG. 8, a method for acquiring and receiver de-ghosting marine seismic data includes acquiring seismic trace data recorded from a common shot by at least two seismic streamers, the at least two streamers adjacent to one another in the cross-line direction and vertically offset from one another, the vertical offset at least different enough to record combinations of seismic signal frequencies which, when combined, are substantially unaffected by receiver-side ghosting as illustrated in step 800. Then, at step 802, a reference seismic trace is selected from the seismic trace data from a first streamer of the at least two streamers. A candidate seismic trace is also selected from the seismic trace data from a second streamer of the at least two streamers, the second streamer adjacent to and vertically offset from the first streamer, the candidate seismic trace being proximal to the reference seismic trace, as indicated by step 804.

Continuing with the embodiment of FIG. 8, step 806 involves applying normal move-out (NMO) correction to the reference seismic trace, whereby an NMO target trace is created. NMO and vertical datum correction are also applied to the candidate seismic trace, whereby a synthesized candidate trace is created as shown in step 808. De-ghosting according to this embodiment is then performed as illustrated in step 810, by performing frequency weighted summation of the synthesized candidate trace and NMO target trace, perturbing the synthesized candidate trace with respect to the NMO target trace, the perturbing step further comprising shifting the time of the synthesized candidate trace with respect to the NMO target trace and repeating the frequency weighted summation and perturbing steps to maximize a parameter of the de-ghosted NMO target trace.

Figure 9A:
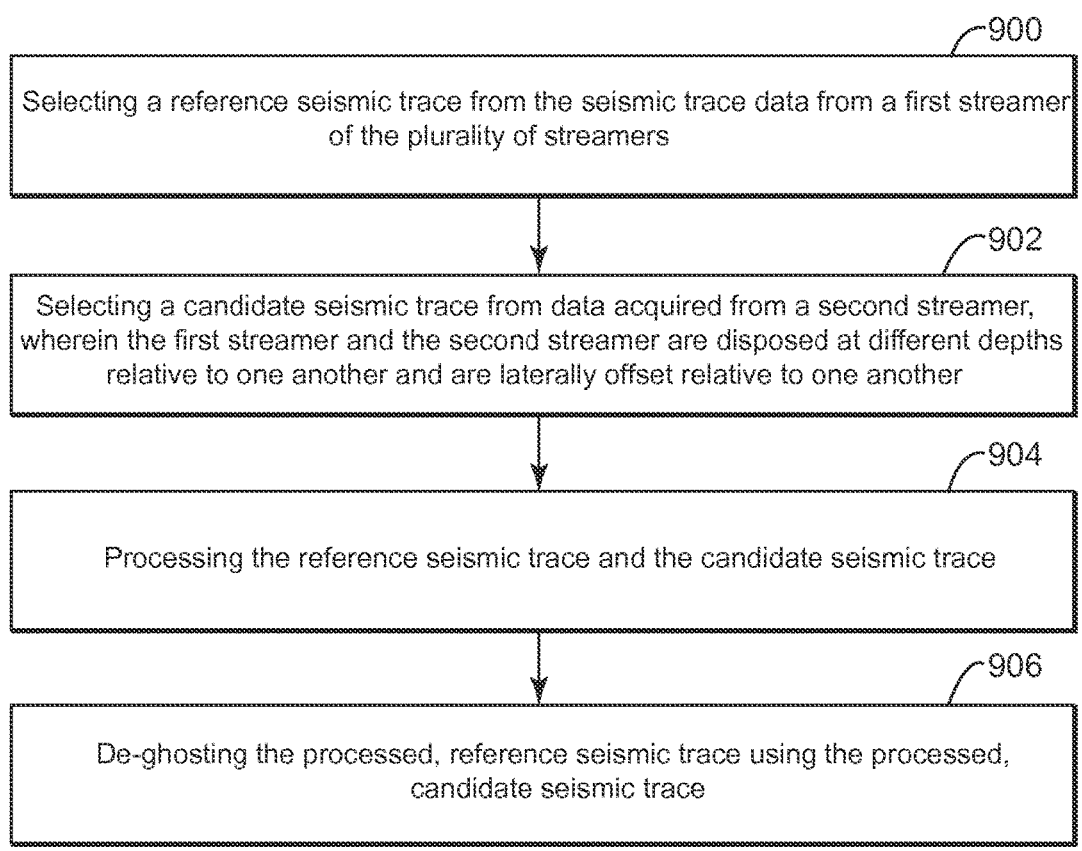

Another, more generalized, exemplary method for receiver de-ghosting of marine seismic trace data is shown in the flowchart of FIG. 9(a). Therein, at step 900, a reference seismic trace is selected from the seismic trace data from a first streamer of the plurality of streamers. A candidate seismic trace is selected from the seismic trace data from a second streamer of the at least two streamers, at step 902, wherein the first streamer and the second streamer are disposed at different depths relative to one another and are laterally offset relative to one another. The reference seismic trace and the candidate seismic trace are processed at step 904, e.g., to perform NMO and/or datum shifting thereon. At step 906, the processed, reference seismic trace is de-ghosted using the processed, candidate seismic trace. Yet another, more generalized, method for seismic data acquisition is shown in the flowchart of FIG. 9(*b*). Therein, at step 910, a first set of streamers is towed at a first depth. At step 912, a second set of streamers is towed at a second depth which is different than the first depth, wherein the streamers in the first set of streamers are laterally offset relative to the streamers in the second set of streamers. The marine seismic data using both the first and second sets of streamers at step 914, e.g., as described above.

Figure 10:
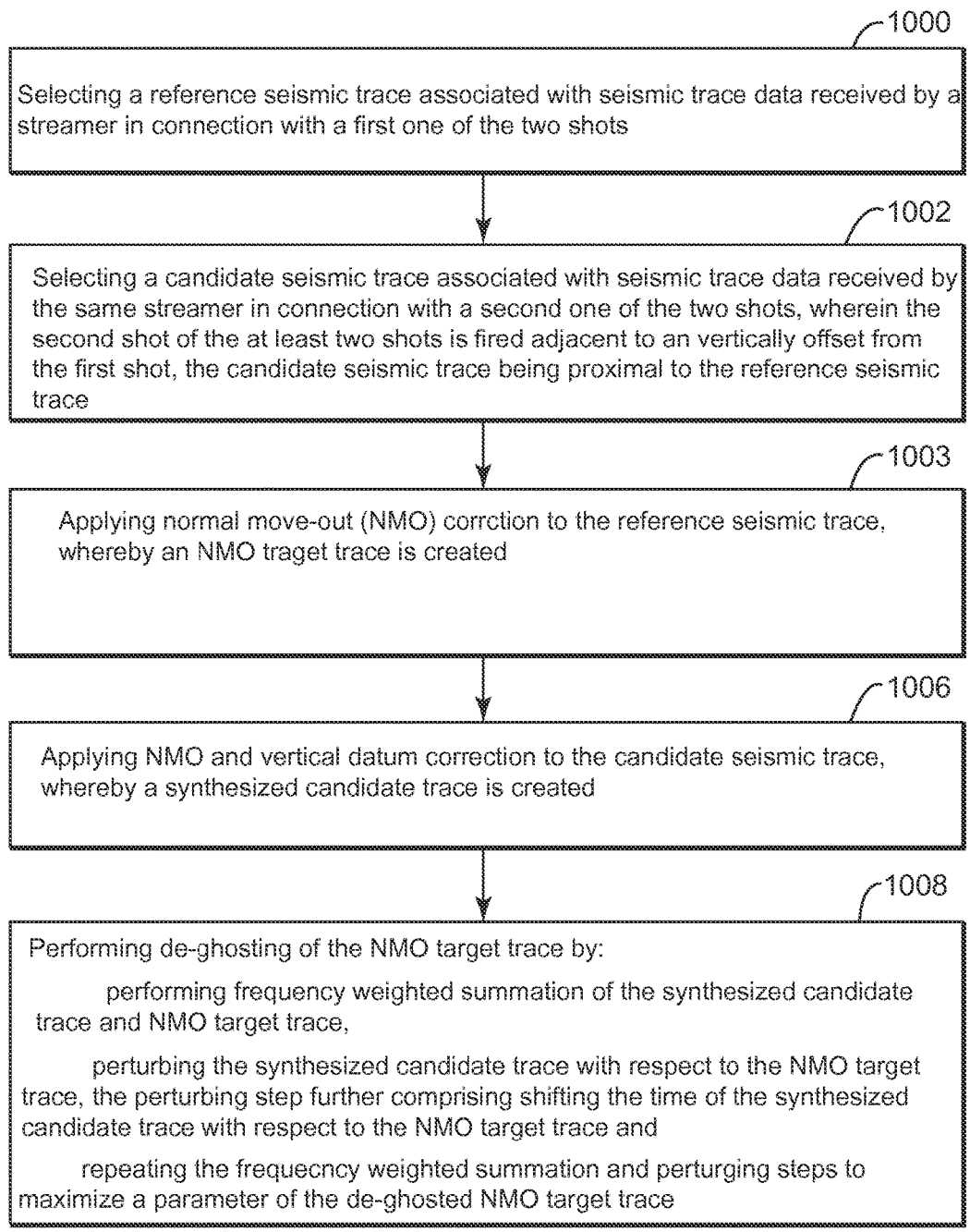

According to another embodiment, a method for source de-ghosting of seismic trace data acquired by two shots each received by a streamer is illustrated in FIG. 10. Therein, at step 1000, a reference seismic trace is selected that is associated with seismic trace data received by a streamer in connection with a first one of the two shots. At step 1002, a candidate seismic trace is selected which is associated with seismic trace data received by the same streamer in connection with a second one of the two shots. In this context, the second shot of the at least two shots is fired adjacent to and vertically offset from the first shot, the vertical offset at least different enough to input combinations of seismic signal frequencies which, when combined, are substantially unaffected by source-side ghosting, and the candidate seismic trace is proximal to the reference seismic trace. A normal move-out (NMO) correction is applied to the reference seismic trace at step 1004, whereby an NMO target trace is created. An NMO and a vertical datum correction are applied to the candidate seismic trace at step 1006, whereby a synthesized candidate trace is created. Then, de-ghosting of the NMO target trace is performed at step 10008 by: performing frequency weighted summation of the synthesized candidate trace and NMO target trace, perturbing the synthesized candidate trace with respect to the NMO target trace, the perturbing step further comprising shifting the time of the synthesized candidate trace with respect to the NMO target trace and repeating the frequency weighted summation and perturbing steps to maximize a parameter of the de-ghosted NMO target trace.

Figure 11:
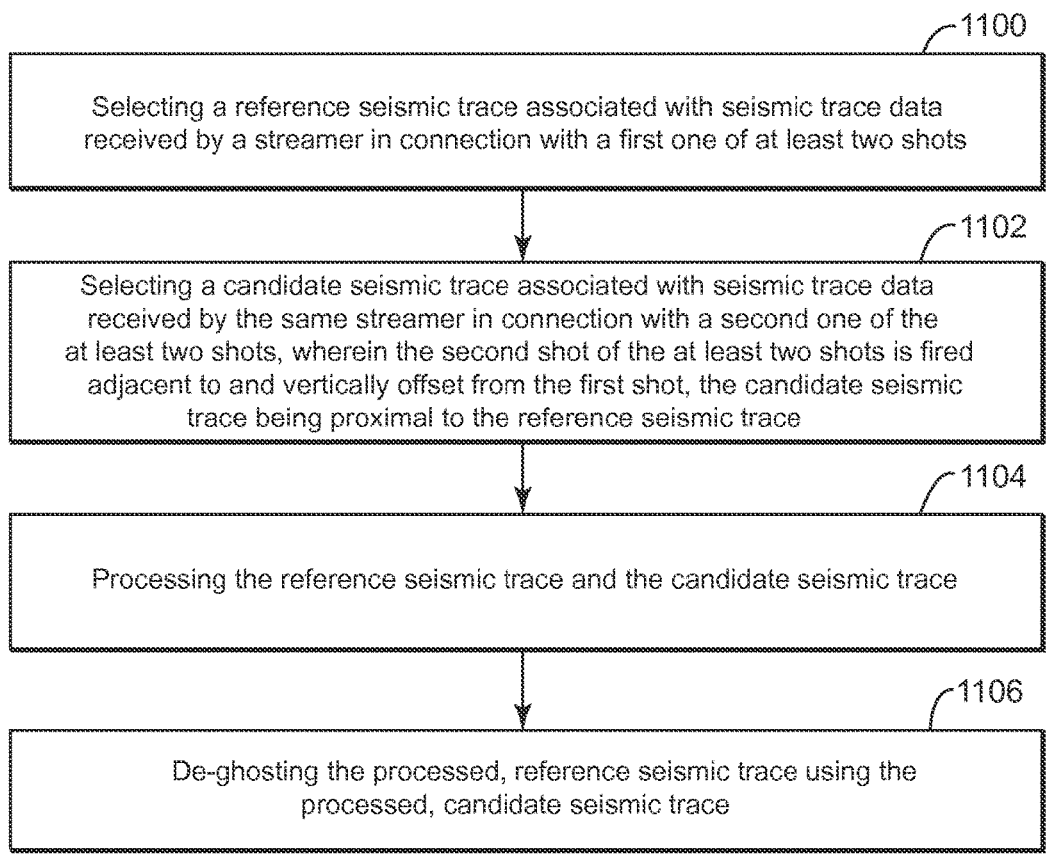

A somewhat more generalized method for source de-ghosting marine seismic trace data is shown in FIG. 11. Therein, a reference seismic trace is selected at step 1100 which is associated with seismic trace data received by a streamer in connection with a first one of at least two shots. At step 1102, a candidate seismic trace is selected which is associated with seismic trace data received by the same streamer in connection with a second one of the at least two shots, wherein the second shot of the at least two shots is fired adjacent to and vertically offset from the first shot, the candidate seismic trace being proximal to the reference seismic trace. The reference seismic trace and the candidate seismic trace are processed at step 1104, and the processed, reference seismic trace is de-ghosted in step 1106 using the processed, candidate seismic trace.

It will be appreciated by those skilled in the art that while the foregoing embodiments have been described as methods, such methods can be implemented in apparatuses or systems which constitute other embodiments. In one example, an apparatus for the acquisition of marine seismic data is described which preferentially records acoustic seismic signals incident at submerged hydrophone receivers so the signals may be processed to minimize the deleterious effect of the down-going water surface ghost reflection of the upcoming wave-field interfering with the upcoming wave-field as it is recorded at the receiver array. The receiver side ghost reflection, as this contamination is known, damages the temporal frequency spectrum and resolution of recorded data by summing a mixture of in and out of phase down-going and up-going pressure fields. The mixture boosts the amplitude of some frequencies so their amplitude is maximally doubled and degrades others so their amplitude is reduced to zero. In the temporal frequency domain these zeros occur at 0 Hz and at a distinct central frequency Fn, with a symmetrical notch or gap of reduced amplitudes in surrounding frequencies. The central frequency is directly dependent on the receiver depth Z and the acoustic energy transmission velocity V within the medium, such that Fn=Vn/(2*Z). Higher harmonics of this notch frequency occur at successive multiples of n, where n equals 1, 2, 3, 4, etc (where n is multiplied by frequency F). The progressive mixture of boost and degradation, arising from the constructive and destructive interference between the two wave-fields manifests as if a repeating series of bandpass filters had been applied. The interfering wave-fields damage the higher temporal frequencies at successive harmonics of the fundamental notch frequency. In one example, a well established de-ghosting method like the de-phase and weighted frequency sum method (Posthumus, 1993) is used to recombine energy recorded at different depths, with different ghost characteristics, to undo the filtering effect and recover the damaged spectral elements.

Figure 12:
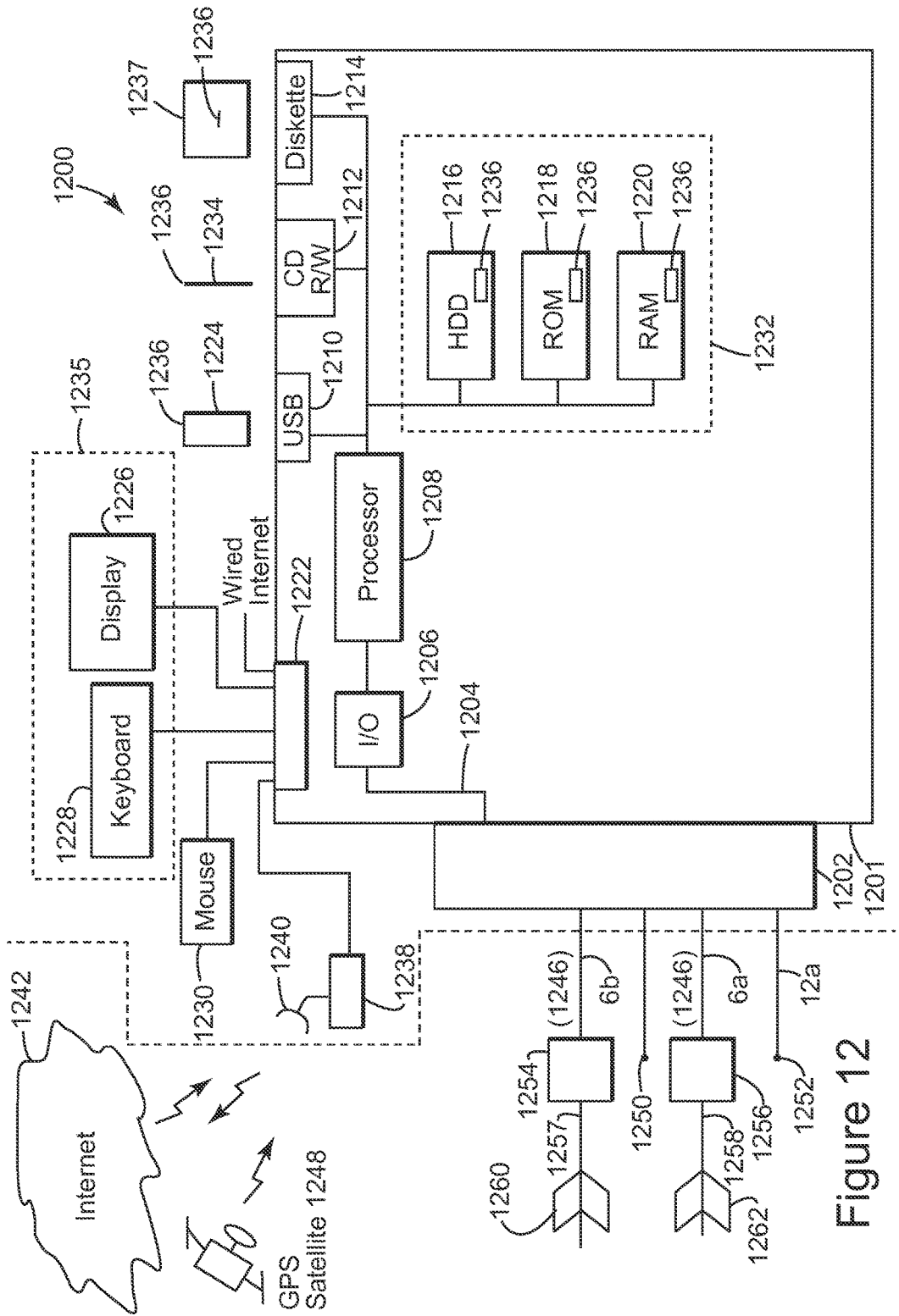
FIG. 12 depicts a seismic data acquisition and processing system. 39

For example, a system or apparatus 1200 can be implemented as shown in FIG. 12 to perform de-ghosting in any of the ways described above. It will be appreciated by those skilled in the art that system 1200 is in all ways illustrative and that the afore-described seismic data processing could be performed in any suitable computing apparatus, including a handheld device. System 1200 includes, among other items, server 1201, source/receiver interface 1202, internal data/communications bus (bus) 1204, processor(s) 1208 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 1210, compact disk (CD)/digital video disk (DVD) read/write (R/W) drive 1212, floppy diskette drive 1214 (though less used currently, many servers still include this device), and data storage unit 1232.

Data storage unit 1232 itself can comprise hard disk drive (HDD) 1216 (these can include conventional magnetic storage media, but, as is becoming increasingly more prevalent, can include flash drive-type mass storage devices 1224, among other types), ROM device(s) 1218 (these can include electrically erasable (EE) programmable ROM (EEPROM) devices, ultra-violet erasable PROM devices (UVPROMs), among other types), and random access memory (RAM) devices 1220. Usable with USB port 1210 is flash drive device 1224, and usable with CD/DVD R/W device 1212 are CD/DVD disks 1234 (which can be both read and write-able). Usable with diskette drive device 1214 are floppy diskettes 1237. Each of the memory storage devices, or the memory storage media (1216, 1218, 1220, 1224, 1234, and 1237, among other types), can contain parts or components, or in its entirety, executable software programming code (software) 1236 that can implement part or all of the portions of the method described herein. Further, processor 1208 itself can contain one or different types of memory storage devices (most probably, but not in a limiting manner, RAM memory storage media 1220) that can store all or some of the components of software 1236.

In addition to the above described components, system 1200 also comprises user console 1235, which can include keyboard 1228, display 1226, and mouse 1230. All of these components are known to those of ordinary skill in the art, and this description includes all known and future variants of these types of devices. Display 1226 can be any type of known display or presentation screen, such as liquid crystal displays (LCDs), light emitting diode displays (LEDs), plasma displays, cathode ray tubes (CRTs), among others. User console 1235 can include one or more user interface mechanisms such as a mouse, keyboard, microphone, touch pad, touch screen, voice-recognition system, among other inter-active inter-communicative devices. User console 1235, and its components if separately provided, interface with server 1201 via server input/output (I/O) interface 1222, which can be an RS232, Ethernet, USB or other type of communications port, or can include all or some of these, and further includes any other type of communications means, presently known or further developed. System 1200 can further include communications satellite/global positioning system (GPS) transceiver device 1238 (to receive signals from GPS satellites 1248), which is electrically connected at least one antenna 1240 (according to an embodiment, there would be at least one GPS receive-only antenna, and at least one separate satellite bi-directional communications antenna). System 1200 can access internet 1242, either through a hard wired connection, via I/O interface 1222 directly, or wirelessly via antenna 1240, and transceiver 1238.

Server 1201 can be coupled to other computing devices, such as those that operate or control the equipment of ship 301, via one or more networks. Server 1201 may be part of a larger network configuration as in a global area network (GAN) (e.g., internet 1242), which ultimately allows connection to various landlines. According to a further embodiment, system 1200, being designed for use in seismic exploration, will interface with one or more sources 1250, 1252 and one or more receivers 1254, 1256. These, as previously described, are attached to streamers 1257, 1258 to which are also attached birds 1260, 1262 that are useful to maintain positioning. As further previously discussed, sources 1250, 1252 and receivers 1254, 1256 can communicate with server 1201 either through an electrical cable that is part of streamer 1257, 1258, or via a wireless system that can communicate via antenna 1240 and transceiver 1238 (collectively described as communications conduit 1246). To simplify this figure only two streamers, two birds, two sources and two receivers are shown although, as described previously, there will typically be more of each in any given system implementation.

According to further embodiments, user console 1235 provides a means for personnel to enter commands and configuration into system 1200 (e.g., via a keyboard, buttons, switches, touch screen and/or joy stick). Display device 1226 can be used to show: streamer 1257, 1258 position; visual representations of acquired data; source 1250, 1252 and receiver 1254, 1256 status information; survey information; and other information important to the seismic data acquisition process. Source and receiver interface unit 1202 can receive the hydrophone seismic data from receiver 1254, 1256 though streamer communication conduit 1146 (discussed above) that can be part of streamer 1257, 1258, as well as streamer position information from birds 1260, 1262; the link is bi-directional so that commands can also be sent to birds 1260, 1262 to maintain proper streamer positioning. Source and receiver interface unit 1102 can also communicate bi-directionally with sources 1250, 1252 through the streamer communication conduit 1246 that can be part of streamer 1257, 1258. Excitation signals, control signals, output signals and status information related to source 1250, 1252 can be exchanged by streamer communication conduit 1146 between system 1200 and source 1250, 1252.

Bus 1204 allows a data pathway for items such as: the transfer and storage of data that originate from either the source sensors or streamer receivers; for processor 1208 to access stored data contained in data storage unit memory 1232; for processor 1208 to send information for visual display to display 1126; or for the user to send commands to system operating programs/software 1236 that might reside in either the processor 1208 or the source and receiver interface unit 1202.

System 1200 can, for example, be used to implement any of the de-ghosting methods described above according to an embodiment. Hardware, firmware, software or a combination thereof may be used to perform the various steps and operations described herein. According to an embodiment, software 1236 for carrying out the above discussed steps can be stored and distributed on multi-media storage devices such as devices 1216, 1218, 1220, 1224, 1234, and/or 1237 (described above) or other form of media capable of portably storing information (e.g., universal serial bus (USB) flash drive 1224). These storage media may be inserted into, and read by, devices such as the CD-ROM drive 1212, disk drives 1214, 1216, among other types of software storage devices.

For example, if used to implement the de-ghosting method of FIG. 9, system 1200 could be described as comprising: a source, at least a first and a second streamer each having a plurality receivers thereon for receiving reflections associated with a shot generated by the source, wherein the first streamer and the second streamer are disposed at different depths relative to one another and are laterally offset relative to one another, and a processor configured to select a reference seismic trace from data acquired from the first streamer; select a candidate seismic trace from data acquired from the second streamer, the processor being further configured to process the reference seismic trace and the candidate seismic trace, e.g., to perform NMO and/or datum shifting; and to de-ghost the processed, reference seismic trace using the processed, candidate seismic trace.

Figure 13:
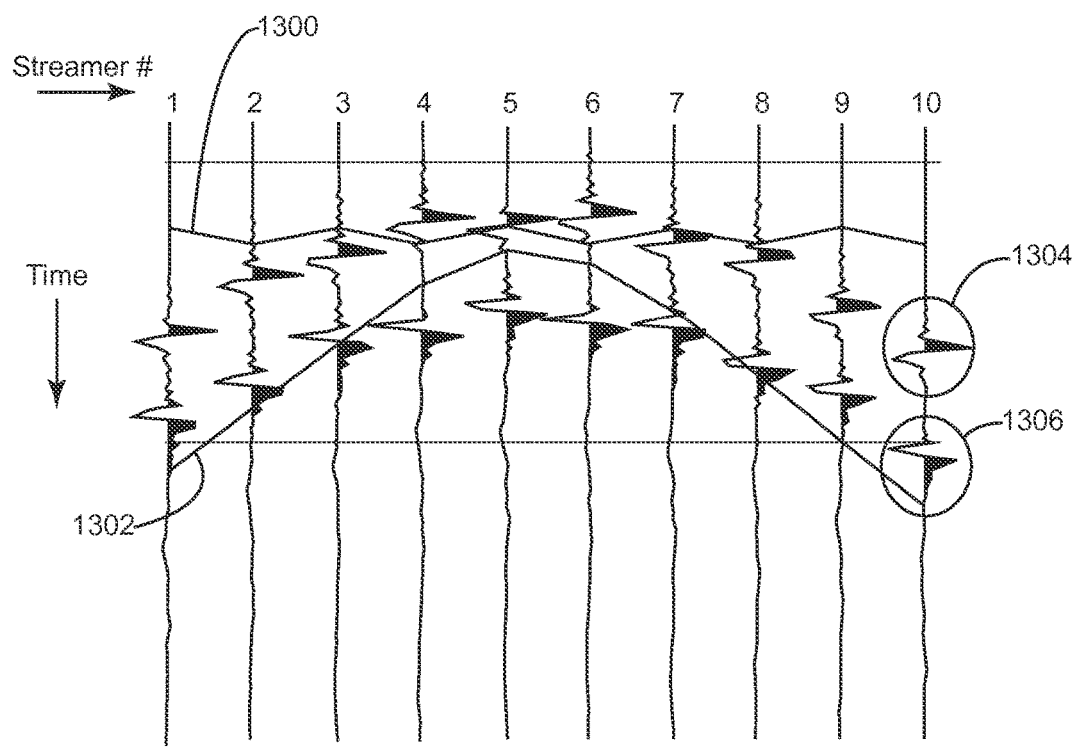
FIGS. 13-15 depict simulated seismic data traces at various stages of de-ghosting according to embodiments.
Figure 14:
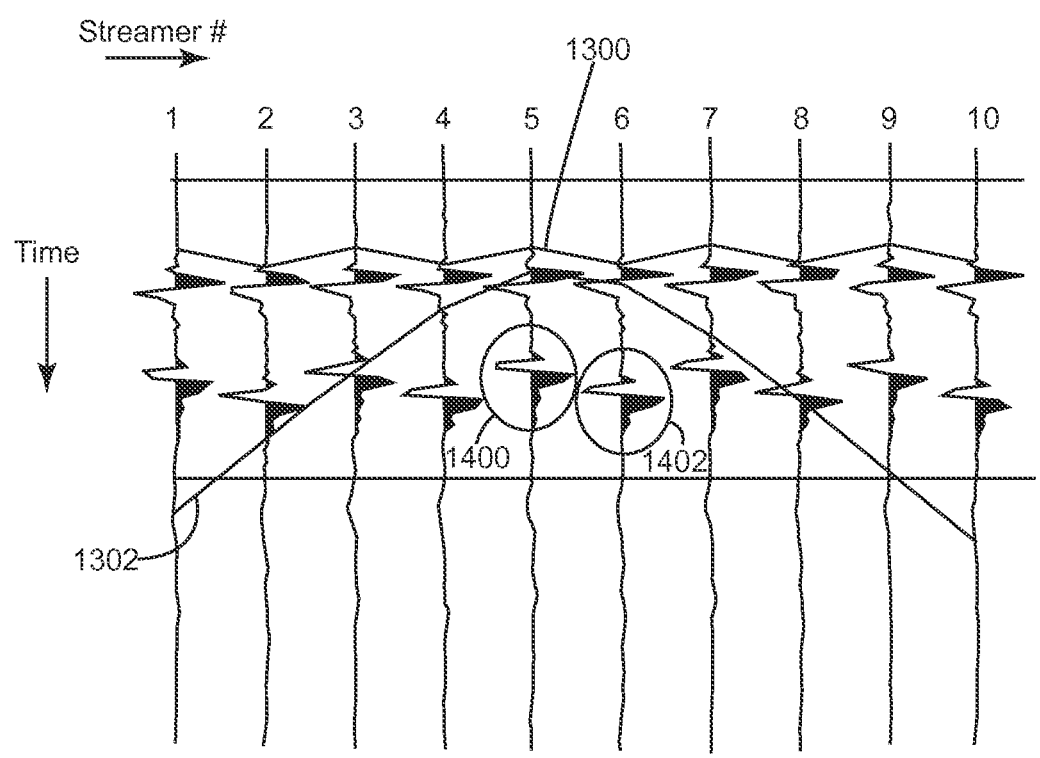
Figure 15:
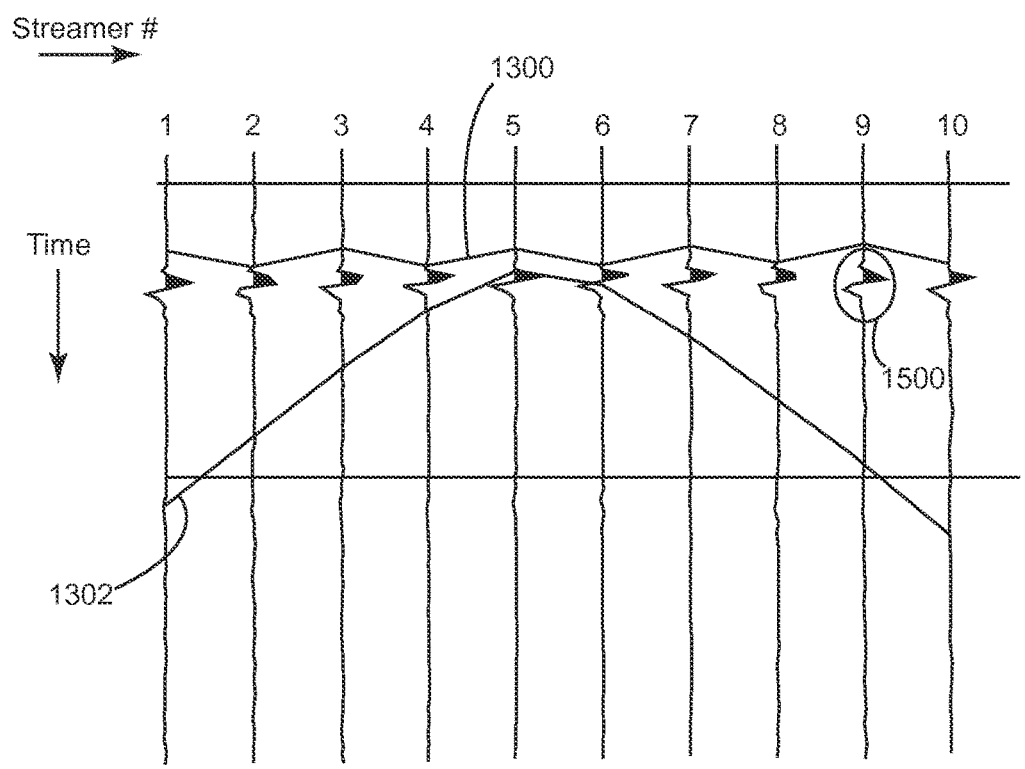

To further illustrate embodiments, FIGS. 13-15 illustrate various aspects of the afore-described embodiments from a data visualization perspective. More specifically, these figures depict computer-generated, synthetic seismic trace data at various stages of the receiver-side de-ghosting embodiments described above. For example, in FIG. 13, a common trace crossline gather of raw input traces from ten streamers (five at one depth and five at another depth, e.g., in a "W" pattern as shown in FIGS. 3 and 4) is shown, i.e., seismic trace data before the processing steps illustrated in FIG. 8 is performed thereon. Zig-zag line 1300 represents the relative depth of the streamers 1-10, while line 1302 represents the source/receiver offset (i.e., varying in a curved fashion as the source is relatively closer to the middle streamers than the streamers on the crossline edges). Each streamer receives both energy associated with a primary wave from a shot reflected from a sub-surface reflector and, a little bit later in time, the same energy reflected with reverse polarity by the sea surface. Examples of the primary wave energy and ghost energy are circled at 1304 and 1306, respectively, for streamer number 10.

Turning now to FIG. 14, this plot illustrates the seismic trace data of FIG. 14 after that data has been processed to perform normal moveout correction and a vertical datum shift. This latter processing step can be seen in that all of the primary wave energy registrations (upper line of pulses) are now substantially in line with one another and ghost energy registrations (lower line of pulses) as compared to the representations of those energies in FIG. 13. Another characteristic of the processed data in FIGS. 13 and 14, is the impact of the different streamer depths on the ghost energy. For example, comparing the ghost energy 1400 that was recorded on streamer #5 in FIG. 14 (after processing) with the ghost energy 1402 that was recorded on streamer #6 in FIG. 14, it can be see that the difference in recording time is attributable to the difference in the streamer depths between these two streamers.

FIG. 15 depicts the seismic trace data after all of the traces are de-ghosted, e.g., using the de-phasing and frequency summation method described above. It will be seen that in addition to substantially or completely removing the line of ghost energy pulses which are seen in FIGS. 13 and 14, the primary wave energy, e.g., 1500 on streamer #9, has a reduced amplitude which effect can be attributed to the removal of constructive interference contributed by the now removed ghost waves.

As can be appreciated, "marine" can refer to any body of water as, for example, a sea, lake or river. In this context, "marine seismic data" can refer to any seismic data acquired in a said marine environment.

The receiver arrays, also termed streamers or cables, are conventionally towed sufficiently below the sea level to avoid interference from wave noise, but shallow enough to ensure that the most damaging of these ghost notches occurs at a high frequency beyond the dominant seismic frequency range. Many streamers are conventionally towed in parallel in the in-line direction behind a shooting vessel to obtain seismic coverage over a wide lateral extent, perpendicular in the cross-line direction, as the vessel transits a survey area.

Conventionally, the parallel streamer array is towed at the same depth. In one embodiment, alternate streamers are towed at a pair of different depths, thereby experiencing a different receiver ghost characteristic. This simple variant of streamer deployment, combined with optimum tow depth selection, delivers data suited to a novel solution for combining energy from different midpoints and depths to mutually de-ghost in one step. Thus, a fundamental problem has been solved by this example, which simultaneously resolves the fact that the shallow and deep data receiver traces are not co-located, yet allows them to be de-ghosted in the process.

In one example, a method is presented where: alternate adjacent streamers are translated at different depths; the receiver traces are interpolated from deep streamer data at the receiver positions of shallow streamers, and vice versa receiver traces are interpolated from shallow streamer data at the receiver positions of the deep streamers; each interpolated receiver trace is combined with its recorded reference receiver trace to de-ghost each of the said reference receiver traces; where the interpolation comprises a data matching of candidate receiver trace(s) from one depth for lateral interpolation to and with the recorded reference receiver trace at another depth which is to be de-ghosted; and where the data matching procedure preserves the ghost characteristics from the candidate receiver trace(s) so they optimally contribute within a de-ghosting technique which seeks to maximize the spectral flatness expected of a ghost free spectrum; whereby said reference receiver trace is substantially receiver-side de-ghosted. In this example, the term "interpolation" refers to the vertical shifting of the selected candidate trace. In one example, optimized de-ghosting is performed by perturbing two receiver traces so that their frequency weighted sum maximizes the Wiener entropy or spectral flatness over a prescribed range of frequencies consistent with the likely receiver or source ghost notch frequencies of the said two receiver traces.

As can be appreciated, "adjacent streamers" can be approximately parallel cables, each containing a plurality of arrays of receivers separated by a typical cross line distance, translated through the water so that they are neighboring or lying on either side of one and other. It is normal to translate an even number of streamers in each survey line, so a pattern of alternating adjacent streamer depths is maintained provided that adjacent survey lines are acquired in the same direction of translation. If translated in opposite directions, one sub-surface line or source-streamer combination line may be sacrificed to maintain the pattern of alternating adjacent streamer depths. This might be achieved by steering the marine vessel that much closer to the neighboring survey line so there is one sub-surface line duplication.

In a further example, the different depths are chosen to maximize the de-ghosting potential of the different observations of the wave-field and the ghost reflections that they record.

In a further example, the adjacent source arrays are translated at different depths. In a further example, the different depths are chosen to maximize the de-ghosting potential of the two or more source array illuminations similar to the selection of streamer depths. The source-side de-ghosting then proceeds using in-line contributors in a similar manner as described above.

As can be appreciated, an "adjacent source" can be a seismic source array which is (a) disposed along the shooting line direction and (b) proximal in terms of position to the reference source but (c) fired by a significantly vertically offset array from the reference source.

As can be appreciated, "significantly vertically offset" can be the at least two different depths with respect to the surface of the body of water such that the spectra of the seismic signals, where each of which is either received by a receiver located at another of said depths, or emitted by a source located at another of said depths, said depths are sufficiently different such that for each frequency within the seismic bandwidth the spectral amplitude of at least one said seismic signal exceeds the spectral amplitude of the likewise received seismic noise. In one embodiment each of said at least two receivers is disposed along a different streamer. In another embodiment each of said at least two different traces is disposed along the same streamer illuminated by a different source.

As can be appreciated, the phrase "optimized de-ghosting" or "de-ghosting" can refer to perturbing two receiver traces so that their frequency weighted sum maximizes the Wiener entropy or spectral flatness over a prescribed range of frequencies consistent with the likely receiver or source ghost notch frequencies of the two receiver traces. "Perturb" can refer to causing the relative vertical alignment of two receiver traces to be varied. Such perturbation is made so as to more optimally align the two signals to compensate for small errors in their move-out, local differences in geological structure and differences in the depth of the receiver or source arising from poor systematic translation control and/or irregular water surface caused by marine vessel, wind, tide or atmospheric pressure induced waves.

As can be appreciated, the phrase "seismic bandwidth" can refer to the range of frequencies that the spectra of seismic signals emitted and received during a seismic survey are supposed to cover. The seismic bandwidth is typically limited by the spectral output of the seismic source used to emit said seismic signals and, in a conventional seismic survey, by the frequency notches of both the source-side and the receiver-side ghosts. In examples described herein, however, the frequency notches of the receiver-side ghost are recovered in one example, and in another example the frequency notches of the source side ghost are also recovered, thus extending the seismic bandwidth beyond the typical limits of a conventional seismic survey.

In one set of examples, a method and system for acquiring and processing marine seismic data is disclosed, including the steps of: translating at least two streamers wherein adjacent streamers are vertically offset from one another, the vertical offset at least different enough to record combinations of seismic signal frequencies undamaged by receiver-side ghosting; acquiring seismic traces; gathering seismic traces into common cross-line receiver offset gathers; applying a normal move-out correction and vertical datum correction to the gathered traces; selecting a reference trace from the gathered traces; selecting a proximal candidate trace or traces within the gathered traces, proximal to the reference trace; constructing or interpolating a synthetic trace from the selected proximal trace(s) at substantially the same location and offset as that of reference trace; applying the synthetic trace and the said reference trace to receiver-side de-ghost the reference trace within successive or overlapping time windows. The method is repeated for the other gathered traces and also for additional other common cross-line receiver offset gathers. In this example, the term "interpolation" refers to the synthesis of the selected proximal trace by vertical shifting of the selected proximal trace.

As can be readily appreciated, the normal move-out correction and vertical datum correction does not have to occur after gathering the seismic traces in that the normal move-out correction and vertical datum correction is applied prior to constructing or interpolating the synthetic trace.

As can be appreciated, a "common cross-line receiver offset gather" can be a collection of seismic traces that (a) belong to a common shot gather and (b) have substantially the same source-receiver offset and (c) have substantially the same in-line position but (d) may differ slightly in source-receiver azimuth.

As can be appreciated, a "datum correction" can be a vertical shift of the received seismic trace to adjust it from the depth of its receiver and/or source below the water surface to the level of the said water surface. The shift may be implemented as a time shift with vertical interpolation or a phase shift in the temporal frequency domain.

As can be appreciated, a "normal move-out correction" can be a dynamic correction applied to recorded seismic traces to align their energies as if all were recorded without any lateral offset between the source and the receiver of said seismic traces.

In one example, the depth of adjacent streamers is chosen to be different half-prime numbers.

In one example, the depth of adjacent streamers are chosen such that the deepest depth to shallowest depth ratio is substantially near to but not exactly 3:2.

In one example, the construction of the synthetic trace is performed by interpolating or extrapolating data from neighboring receivers.

In one example, the de-ghosting step comprises frequency weighted summation using the method of Posthumus ("De-ghosting using a twin streamer configuration", Geophysical Prospecting 41, 267-287, 1993 and incorporated herein by reference).

In one example, the de-ghosting step utilizes ghost characterization derived from measured depth of translated receivers and theoretical water surface reflection coefficient of approximately −1.0.

In a further example, the de-ghosting step utilizes ghost characterization determined from the autocorrelation of the respective receiver traces but somewhat constrained by the characterization derived from measured depth of translated receivers and theoretical water surface reflection coefficient of approximately −1.0.

In a further example, the de-ghosting step and the interpolating or extrapolating step includes an optimization which is facilitated by picking the peak time delay of a temporal cross correlation of any neighbouring candidate receiver trace for de-ghosting interpolation with the reference receiver trace to constrain their alignment.

In a further example, the de-ghosting step and the interpolating or extrapolating step includes time variant optimized de-ghosting wherein each optimized de-ghosting step as described, occurs separately in short abutting or overlapping time windows. Such a time variant approach accommodates expected variations in both the ghost characteristics and in the expected structural, move-out etc variations relevant to the implicit interpolation/extrapolation within the optimized de-ghosting.

In one embodiment, a method and system for acquiring and processing marine seismic data is disclosed, including the steps of: translating at least two sources wherein adjacent sources are vertically offset from one another, the vertical offset at least different enough to input combinations of seismic signal frequencies undamaged by source-side ghosting; acquiring seismic traces; gathering seismic traces from two or more adjacent shot sources into common streamer in-line receiver offset gathers; applying a normal move-out correction and vertical datum correction to the gathered traces; selecting a reference trace from the gathered traces; selecting a proximal candidate trace or traces within the gathered traces, proximal to the reference trace; constructing a synthetic trace from the selected proximal trace(s); and applying the synthetic trace and the said reference trace to source-side de-ghost the reference trace within successive or overlapping time windows. The method is repeated for the other gathered traces and also for additional other common streamer in-line receiver offset gathers.

As can be readily appreciated, the normal move-out correction and vertical datum correction does not have to occur after gathering the seismic traces in that the normal move-out correction and vertical datum correction is applied prior to constructing the synthetic trace.

As can be appreciated, a "common in-line streamer offset gather" can be a collection of seismic traces that (a) belong to a common streamer gather but (b) differ slightly in source receiver offset and azimuth content because they comprise both reference source and adjacent source received traces.

In one example, the depth of adjacent sources is chosen to be different half-prime numbers.

In one example, the depth of adjacent sources is chosen such that the deepest depth to shallowest depth ratio should be substantially near to but not exactly 3:2.

In one example, the construction of the said synthetic trace is done by interpolating or extrapolating data from adjacent source receivers.

In one example, the de-ghosting step comprises frequency weighted summation using the method of Posthumus ("Deghosting using a twin streamer configuration", Geophysical Prospecting 41, 267-287, 1993 and incorporated herein by reference).

In one example, the de-ghosting step utilizes ghost characterization derived from measured depth of translated receivers and theoretical water surface reflection coefficient of approximately −1.0.

In a further example, the de-ghosting step utilizes ghost characterization determined from the autocorrelation of the respective receiver traces but somewhat constrained by the characterization derived from measured depth of translated receivers and theoretical water surface reflection coefficient of approximately −1.0.

In a further example, the de-ghosting step and the interpolating or extrapolating step includes an optimization which is facilitated by picking the peak time delay of a temporal cross correlation of any neighbouring candidate receiver trace for de-ghosting interpolation with the reference receiver trace to constrain their alignment.

In a further example, the de-ghosting step and the interpolating or extrapolating step includes time variant optimized de-ghosting wherein each optimized de-ghosting step as described, occurs separately in short abutting or overlapping time windows. Such a time variant approach accommodates expected variations in both the ghost characteristics and in the expected structural, move-out etc variations relevant to the implicit interpolation/extrapolation within the optimized de-ghosting.

In one set of examples, a method for acquiring and processing marine seismic data is disclosed, including the steps of: translating at least two streamers wherein adjacent streamers are vertically offset from one another, the vertical offset at least different enough to record combinations of seismic signal frequencies undamaged by receiver-side ghosting; translating at least two sources wherein adjacent sources are vertically offset from one another, the vertical offset at least different enough to input combinations of seismic signal frequencies undamaged by source-side ghosting; acquiring seismic traces; then gathering seismic traces into common cross-line receiver offset gathers; selecting a first reference trace from the cross-line receiver offset gathered traces; selecting a first proximal candidate trace or traces within the gathered traces, proximal to the first reference trace; constructing or interpolating a first synthetic trace from the selected first proximal trace(s) at substantially the same location and offset as that of the first reference trace; applying the first synthetic trace and the said first reference trace to receiver-side de-ghost the first reference trace within successive or overlapping time windows; gathering receiver-side de-ghosted seismic traces from two or more adjacent shot sources into common streamer in-line receiver offset gathers; selecting a second reference trace from the in-line receiver gathered traces; selecting a second proximal candidate trace or traces within the in-line receiver gathered traces, proximal to the second reference trace; constructing a second synthetic trace from the selected second proximal trace(s); and applying the second synthetic trace and the second reference trace to source-side de-ghost the second reference trace within successive or overlapping time windows; and where a normal move-out correction and vertical datum correction is applied to the traces prior to constructing or interpolating the first synthetic trace and prior to constructing the second synthetic trace.

In one example, the source de-ghosting precedes the receiver de-ghosting. For example, a method for acquiring and processing marine seismic data is disclosed, including the steps of: translating at least two streamers wherein adjacent streamers are vertically offset from one another, the vertical offset at least different enough to record combinations of seismic signal frequencies undamaged by receiver-side ghosting; translating at least two sources wherein adjacent sources are vertically offset from one another, the vertical offset at least different enough to input combinations of seismic signal frequencies undamaged by source-side ghosting; acquiring seismic traces; then gathering seismic traces from two or more adjacent shot sources into common streamer in-line receiver offset gathers; selecting a first reference trace from the in-line receiver gathered traces; selecting a first proximal candidate trace or traces within the in-line receiver gathered traces, proximal to the first reference trace; constructing a first synthetic trace from the selected first proximal trace(s); applying the first synthetic trace and the first reference trace to source-side de-ghost the first reference trace within successive or overlapping time windows; gathering source-side de-ghosted seismic traces into common cross-line receiver offset gathers; selecting a second reference trace from the cross-line receiver offset gathered traces; selecting a second proximal candidate trace or traces within the cross-line receiver gathered traces, proximal to the second reference trace; constructing or interpolating a second synthetic trace from the selected second proximal trace(s) at substantially the same location and offset as that of the second reference trace; and applying the second synthetic trace and the second reference trace to receiver-side de-ghost the second reference trace within successive or overlapping time windows; and where a normal move-out correction and vertical datum correction is applied to the traces prior to constructing or interpolating the first synthetic trace and prior to constructing the second synthetic trace.

In one example, the source-side and receiver-side de-ghosting are combined. For example, a method for acquiring and processing marine seismic data is disclosed, including the steps of: translating at least two streamers wherein adjacent streamers are vertically offset from one another, the vertical offset at least different enough to record combinations of seismic signal frequencies undamaged by receiver-side ghosting; translating at least two sources wherein adjacent sources are vertically offset from one another, the vertical offset at least different enough to record combinations of seismic signal frequencies undamaged by source-side ghosting; acquiring seismic traces; then gathering seismic traces from two or more adjacent shot sources; to de-ghost each reference trace in turn contained in said gather; selecting a proximal candidate trace or traces having the same receiver number as the reference trace from one or more adjacent streamers to the reference trace, but coming from a different source than that of the reference trace; constructing a synthetic trace from the selected candidate trace or traces; applying the synthetic trace and the reference trace to simultaneously source-side and receiver-side de-ghost the reference trace within successive or overlapping time windows.

In one example, the receiver de-ghosting step comprises frequency weighted summation using the method of Posthumus ("Deghosting using a twin streamer configuration", Geophysical Prospecting 41, 267-287, 1993 and incorporated herein by reference). In one example, the source de-ghosting step comprises frequency weighted summation using the method of Posthumus ("Deghosting using a twin streamer configuration", Geophysical Prospecting 41, 267-287, 1993 and incorporated herein by reference). In one example, both the receiver and source de-ghosting steps comprise frequency weighted summation using the method of Posthumus ("Deghosting using a twin streamer configuration", Geophysical Prospecting 41, 267-287, 1993 and incorporated herein by reference).

In one example, the receiver de-ghosting step utilizes ghost characterization derived from measured depth of translated receivers and theoretical water surface reflection coefficient of approximately −1.0. In one example, the source de-ghosting step utilizes ghost characterization derived from measured depth of translated sources and theoretical water surface reflection coefficient of approximately −1.0. In one example, the receiver de-ghosting step utilizes ghost characterization derived from measured depth of translated receivers and theoretical water surface reflection coefficient of approximately −1.0 and the source de-ghosting step utilizes ghost characterization derived from measured depth of translated sources and theoretical water surface reflection coefficient of approximately −1.0.

In a further example, the receiver de-ghosting step utilizes ghost characterization determined from the autocorrelation of the respective receiver traces but somewhat constrained by the characterization derived from measured depth of translated receivers and theoretical water surface reflection coefficient of approximately −1.0.

In a further example, the receiver de-ghosting step and the interpolating or extrapolating step includes an optimization which is facilitated by a temporal cross correlation of the two signals (the time-windowed candidate trace and the time-windowed reference trace) to constrain their alignment. In a further example, the source de-ghosting step includes an optimization which is facilitated by a temporal cross correlation of the two signals (the time-windowed candidate trace and the time-windowed reference trace) to constrain their alignment. In a further example, the source de-ghosting step and the receiver de-ghosting step with the interpolating or extrapolating step includes an optimization which is facilitated by a temporal cross correlation of the two signals (the time-windowed candidate trace and the time-windowed reference trace) to constrain their alignment.

In a further example, the receiver de-ghosting step and the interpolating or extrapolating step includes time variant optimized de-ghosting wherein each optimized de-ghosting step as described, occurs separately in short abutting or overlapping time windows. Such a time variant approach accommodates expected variations in both the ghost characteristics and in the expected structural, move-out etc variations relevant to the implicit interpolation/extrapolation within the optimized de-ghosting. In a further example, the source de-ghosting step includes time variant optimized de-ghosting wherein each optimized de-ghosting step as described, occurs separately in short abutting or overlapping time windows. In a further example, the receiver de-ghosting step with the interpolating or extrapolating step and the source de-ghosting step includes time variant optimized de-ghosting wherein each optimized de-ghosting step as described, occurs separately in short abutting or overlapping time windows.

In one example, alternate adjacent streamers are towed at two different constant depths, illustrated in FIGS. 3 and 4 as 321s, 322d, 323s, 324d, 325s, 326d, 327s, 328d for an eight (8) cable example. Cables are annotated with sequential numbering and a 's' or 'd' to indicate shallow or deep tow. Contrast this with a conventional deployment as exemplified by FIG. 1. This shows a typical disposition of source arrays and streamers of receiver arrays translated behind a towing vessel. A multiplicity of sources and streamers is generally deployed. Two sources and eight streamers or cables are shown in this example. The conventional distribution of source and streamer arrays within the water layer is also shown in cross-section in FIG. 2. Typically, two or more sources are towed side by side at the same depth, five (5) meter for example, with two or more streamers towed slightly deeper, for example, all at six (6) meter depth. This staggered streamer configuration which in cross-section FIG. 4 appears like a "W", provides data characterized by two distinct receiver ghost periodicities and apparent spectra. In one embodiment, as shown in FIG. 3, multiple streamers are deployed at alternate depths behind the shooting vessel, so that most streamers are bounded on either side by a streamer towed at a different depth. In one example, outer streamers share one neighbour from the current sail-line and one from the outer streamer of an adjacent sail-line. In an example where adjacent sail-lines are shot in the same direction, and an even number of streamers are deployed, the outer streamers share pairs of adjacent streamers of different depths. In an example where the adjacent sail-line has been acquired in the opposite shooting direction, known as a swath boundary, then adjacent streamers will have the same tow depth. As this is undesirable for the process, adjacent but opposite shooting swaths, in one example, are reconfigured to sacrifice one boundary line so that a streamer with an opposing tow depth is adjacent. This implicitly means that that the central line track of such swath boundary lines should lie one subsurface line interval closer to the neighbouring swath than normal to obtain the desired adjacent cable depth variation.

In one example, two distinct tow depths are selected to minimize the filtering effect on low frequency data; to maximize the signal to noise by towing well below the typically noisy sea surface, and to ensure that harmonics of the respective notch frequencies coincide beyond the useful part of the observed seismic spectrum. Tow depth is ultimately limited by streamer equipment rating and the water depth in the survey area, whichever is shallower.

In one example, de-ghosting is achieved by the well known de-phase and frequency weighted summation method according to Posthumus (1993). This requires at least two traces: i) the target trace to be de-ghosted and ii) a coincident candidate trace having a distinctly different ghost reflection characteristic. The alternating streamer layout as described herein and shown schematically in isometric form FIG. 3 and in cross section in FIG. 4 provides neighbouring traces at the same in-line distance, in the direction perpendicular to the towing direction, with the desired distinctly different ghost reflection characteristic. In one example, these traces are interpolated to complete the de-ghosting trace pair. FIG. 5 illustrates with cross symbols where interpolated receiver traces are synthesized, directly above or below the receiver trace (shown by triangle symbols) to be de-ghosted. One consideration, however, is that interpolation from data separated in the cross-line direction is usually complicated by its poor spatial sampling, which is typically a factor of two or worse, more coarsely sampled than the in-line direction. However, such situation is simplified by the presence of the target receiver trace itself which after normal move-out and datum adjustment acts as an interpolation template in all but its ghost characteristic.

In one example, the interpolation is achieved by a form of trace matching to make the input receiver trace appear like the template receiver trace. One consideration, however, is that this would have the undesirable effect of making their ghost properties similar, which would defeat the de-ghosting objective. In further example, the trace matching, and hence interpolation, proceeds as a process of optimization of the de-ghosting itself. In one example, this is achieved by perturbing each interpolation candidate receiver trace to maximize the Wiener entropy or spectral flatness of its de-ghosted result with the reference receiver trace. In one example, the perturbation comprises small vertical shifts performed within short time windows to compensate for time variant structure, move-out, or datum residuals. On each perturbation the resultant de-ghosted spectrum's Wiener entropy is assessed over a range of frequencies where ghost notches are predicted to lie. In one example, where the de-ghosting is performed in the temporal frequency domain, the range of frequencies is similarly constrained, to minimize the cost of each perturbation.

In one example, the method is enhanced by estimating receiver depth and water surface reflectivity from the receiver trace data itself as its auto-correlation contains a signature of the ghost. These properties govern the ghost effect and, in one example, are parameters used for application of the Posthumus (1993) method. In one example, the auto-correlation peak-to-trough ratio is used as being indicative of the reflectivity, and, in further example, the time lag of the trough associated with the ghost period is used in conjunction with the velocity of wave propagation within the fluid medium to estimate the depth of receiver.

In a further example, FIG. 6 illustrates varying the relative depth of the source arrays (annotated as 611 and 612), which delivers source-side ghost variation. In one example, successive source arrays are fired alternately along the translation line direction. In one example, the sources are also separated in space laterally, so their received trace midpoints, half-way between source and receiver are displaced both in-line and cross-line. The additional difference in depth of the sources makes minimal difference to this lateral distribution. However the variation in source ghost character provides the opportunity to perform source-side de-ghosting similar to the preceding embodiment.

In one example, adjacent streamers are deployed at two different but constant tow depths alternating in the cross-line direction at deep, shallow, deep etc, or (in alternate example) shallow, deep, shallow, etc depths below the water surface. The overall vessel, source and cable configuration is illustrated schematically in FIG. 3. FIG. 4 shows the alternating streamer depth deployment and, for comparison, FIG. 2 shows a conventional tow depth configuration.

In one example, two discrete tow depths are chosen to be halves of two different prime numbers so that the path difference between up-going energy and its ghost reflection from the air-water interface are both prime numbers and therefore have a lowest common factor of one (1) distance unit. This ensures that their common ghost harmonic frequency tends toward the shortest possible wavelength and therefore highest possible temporal frequency. The shift of any such common notch frequency to the high end of the digitally recorded seismic spectrum allows their processed energy recombination to occur with the least damage to the seismic spectrum, i.e. beyond the maximum recording or Nyquist frequency.

In one further example, alternate streamer tow depths are selected to maximize the amplitude overlap at the notch frequency of each other. In a further preferred example, notch frequency combinations with a ratio Fshallow:Fdeep near to 3:2 (or 1.5) are selected, so that a peak in one spectrum occurs at the same frequency as a notch in the other. In a further preferred example, notch frequency combinations are further selected that have a Fshallow to Fdeep ratio that is near to, but not exactly, 3:2. In certain situations, the combination would not be suitable for the higher harmonic notches as it would lead to a coincident notch at interval 2*Fshallow and 3*Fdeep. No signal would be recorded at coincident notch frequencies, but these would not occur if half prime numbered depths, greater than 1, were selected. In this way at least one of the two tow depths observes signal frequencies not significantly attenuated by destructive interference, such that in combination any one frequency is substantially unaffected by ghosting.

In one example, deep tow has distinct advantages of increased signal to noise ratio. This allows data acquisition to attempt to continue in worse sea state conditions than would be tolerable for shallow tow configurations. In one example, a pair of tow depths used for the receiver streamers is, 19/2 and 29/2 (for example, 9.5 and 14.5 meters), both half primes with second notch frequencies, in this example, of about Fshallow=79 Hz and Fdeep=52 Hz respectively and a ratio of 1.52. These depths are easily deployed and within safe operating tolerances for typical current seismic marine streamers.

In further examples, other pairs of half prime number depths are deployed shallower if the water depth were itself shallow, or deeper if increased signal to noise ratio is desired. In one example, a graph of the first 20 or so half prime numbers, greater than 1, and constrained to those whose Fshallow:Fdeep ratio lie in the range 1.4-1.6, is used to guide selection of alternative pairs of depth combinations.

In one example, the de-ghosting process combines the recorded energies from the two different tow depths using the Posthumus (1993) method. However this otherwise conventional multi-source and streamer geometry means there are no coincident midpoint traces with different ghost characteristics recorded. To de-ghost any recorded shallow receiver trace (e.g. FIG. 5 labeled triangle 323$s$) we appear to need to interpolate a trace from the other recording depth data (FIG. 5 at cross location 523$d$ below 323$s$). This is a classically difficult problem to solve and the cross-line domain is poorly sampled relative to the in-line direction. However the interpolation is facilitated in this case by the presence of the target trace itself which, in all but the ghost response difference, forms a template for the interpolation of energy from the alternate tow depth recorded wave-field. The ghost response difference is predictable given the receiver tow depth. Within the cross-line offset domain of a single shot and channel, in this example, alternate streamer-trace de-ghosting and interpolation is combined as a single optimization of the "Wiener entropy" or spectral flatness of the de-ghosted result of itself with its immediate neighbour(s). The optimization proceeds by perturbing the move-out and vertical alignment of the neighbouring candidate trace(s) to accommodate dynamic source-receiver offset effects and structural differences between them and the target trace. In one example, such gross vertical differences are measured using cross-correlation peak picking techniques. In one example, through maximizing the Wiener entropy norm both interpolation and de-ghosting is simultaneously optimized. In one example, this is performed in the vicinity of predictable notch frequencies within targeted frequency bands and within time variant windows to accommodate time variant residuals of move-out, structure and ghost effects.

In one example, outer streamer de-ghosting is achieved by extrapolating energy from inner streamers or, in alternate example, by sharing traces from adjacent sail-lines shot in the same direction. Sail-lines shot in the opposite direction are shifted the equivalent of one sub-surface bin-line nearer to the adjacent swath edge, to sacrifice that one bin-line and enabling de-ghosting of the adjacent outer cable combinations. Successive sail-lines in the new swath are spaced as normal with abutting subsurface lines. In one example, additional opposing direction swaths have the same abutting subsurface line sacrifice done to ensure a continuity of shallow/deep/shallow/deep etc streamer deployment in the cross line direction. In practice, the de-ghosting of outer streamer data traces is merely a special case of interpolation, being a short extrapolation from the most adjacent inner streamer.

In one example, the de-ghosted seismic traces are processed conventionally at a common reference datum with all the benefits of their increased bandwidth.

In one example, sources are towed at different depths to enable de-ghosting the source-side effect. In one example, candidate traces for the combined interpolation and source-side de-ghosting are selected from the same streamer and receiver trace as the target trace, but from adjacent sources instead of adjacent streamers. In another example, candidate trace or traces for the combined interpolation, source and receiver-side de-ghosting are selected from adjacent streamer or streamers, at the same receiver trace as the target trace, and from adjacent sources.

It can be appreciated in the disclosure of the methods described herein that the corresponding physical acquisition systems have been implicitly and/or explicitly described. Further, it can be appreciated in the disclosure of the methods described herein that the corresponding electronics and computer hardware physical systems for performing the sensing and seismic processing steps have been implicitly and/or explicitly described.

Thus, the foregoing description is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant structural or mechanical art. Further, the embodiments described are also intended to to enable others skilled in the art to utilize the invention and such or other embodiments and with various modifications required by the particular applications or uses of the invention.

The invention claimed is:

1. A method for acquiring and receiver de-ghosting marine seismic data, comprising:
   acquiring seismic trace data recorded from a common shot by at least two seismic streamers, the at least two streamers adjacent to one another in the cross-line direction and vertically offset from one another, the vertical offset at least different enough to record combinations of seismic signal frequencies which are substantially unaffected by receiver-side ghosting;
   selecting a reference seismic trace from the seismic trace data from a first streamer of the at least two streamers;
   selecting a candidate seismic trace from the seismic trace data from a second streamer of the at least two streamers, the second streamer adjacent to and vertically offset from the first streamer, the candidate seismic trace being proximal to the reference seismic trace;
   applying normal move-out (NMO) correction to the reference seismic trace, whereby an NMO target trace is created;
   applying NMO and vertical datum correction to the candidate seismic trace, whereby a synthesized candidate trace is created; and
   performing de-ghosting of the NMO target trace by:
      performing frequency weighted summation of the synthesized candidate trace and NMO target trace,
      perturbing the synthesized candidate trace with respect to the NMO target trace, the perturbing step further comprising shifting the time of the synthesized candidate trace with respect to the NMO target trace and repeating the frequency weighted summation and perturbing steps to maximize a parameter of the de-ghosted NMO target trace.

2. The method of claim 1, wherein the de-ghosting step is performed on a plurality of time-variant windows.

3. The method of claim 1, wherein the parameter is one of: a Wiener entropy over a range of frequencies, an average power spectrum over a range of frequencies, or an average amplitude spectrum over a range of frequencies.

4. The method of claim 1, wherein the perturbing step comprises varying a depth parameter of one or both of the synthesized candidate trace and the NMO target trace.

5. The method of claim 1, wherein the perturbing step further comprises perturbing the reflectivity of both NMO target trace and synthesized candidate traces away from their theoretical value of negative one (−1).

6. The method of claim 1, wherein the vertical offset is such that a depth of each of the at least two streamers is a different half-prime number.

7. The method of claim 1, wherein the vertical offset is such that the at least two streamers have depths which yield a deep to shallow ratio that is approximately three to two.

8. A method for acquiring marine seismic data comprising:
   towing a first set of streamers at a first depth;
   towing a second set of streamers at a second depth, which is different than the first depth, wherein first streamers in the first set of streamers are laterally offset relative to second streamers in the second set of streamers; and
   acquiring the marine seismic data using both the first and second sets of streamers,
   wherein the first and second streamers alternate along a cross-line direction, which is perpendicular to a length of the first and second streamers, so that each first streamer is adjacent to two second streamers along the cross-line direction and each second streamer is adjacent to two first streamers along the cross-line direction, except for outer most streamers, and
   wherein the first depth and the second depth are halves of different prime numbers times a distance unit.

9. The method of claim 8, further comprising:
   acquiring a reference seismic trace using one of the first streamers in the first set of streamers;
   acquiring a candidate seismic trace using one of the second streamers in the second set of streamers;
   processing the reference seismic trace and the candidate seismic trace; and
   de-ghosting the processed, reference seismic trace using the processed, candidate seismic trace.

10. The method of claim 9, wherein the step of processing further comprises:
   applying normal move-out (NMO) correction to the reference seismic trace,
   applying NMO correction to the candidate seismic trace, and
   applying a vertical datum correction to at least one of the reference seismic trace and the candidate seismic trace, and
wherein the step of de-ghosting further comprises:
   performing frequency weighted summation of the processed, reference seismic trace and the processed, candidate seismic trace;

perturbing the processed, candidate trace with respect to the processed, reference trace; and repeating the frequency weighted summation and perturbing steps to generate a de-ghosted reference trace.

11. The method of claim 8, wherein the different depths have a deep to shallow ratio that is approximately three to two.

12. The method of claim 1, wherein the at least two streamers include different receivers.

13. The method of claim 1, wherein each of the at least two streamers include different receivers.

14. The method of claim 8, wherein the first and second streamers include different receivers.

15. The method of claim 8, wherein each of the first and second streamers include different receivers.

* * * * *